US012723295B2

(12) United States Patent
Nakano et al.

(10) Patent No.: US 12,723,295 B2
(45) Date of Patent: Sep. 1, 2026

(54) STEEL SHEET

(71) Applicant: NIPPON STEEL CORPORATION, Tokyo (JP)

(72) Inventors: Katsuya Nakano, Tokyo (JP); Kunio Hayashi, Tokyo (JP); Yuri Toda, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 150 days.

(21) Appl. No.: 18/709,490

(22) PCT Filed: Jan. 21, 2022

(86) PCT No.: PCT/JP2022/002202

§ 371 (c)(1),
(2) Date: Oct. 7, 2024

(87) PCT Pub. No.: WO2023/139752

PCT Pub. Date: Jul. 27, 2023

(65) Prior Publication Data

US 2025/0305102 A1 Oct. 2, 2025

(51) Int. Cl.

*C22C 38/40* (2006.01)
*B32B 15/01* (2006.01)

(Continued)

(52) U.S. Cl.

CPC ............ *C22C 38/40* (2013.01); *B32B 15/013* (2013.01); *B32B 15/04* (2013.01); *B32B 15/043* (2013.01); *B32B 15/18* (2013.01); *C21D 1/185* (2013.01); *C21D 1/19* (2013.01); *C21D 1/25* (2013.01); *C21D 1/26* (2013.01); *C21D 1/76* (2013.01); *C21D 8/0226* (2013.01); *C21D 8/0263* (2013.01); *C21D 8/0273* (2013.01); *C21D 8/0426* (2013.01); *C21D 8/0463* (2013.01); *C21D 8/0473* (2013.01); *C21D 9/46* (2013.01); *C21D 9/48* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01);

(Continued)

(58) Field of Classification Search

CPC ..... C22C 38/40; C22C 38/001; C22C 38/002; C22C 38/005; C22C 38/008; C22C 38/02; C22C 38/04; C22C 38/06; C22C 38/18; C22C 38/20; C22C 38/22; C22C 38/24; C22C 38/26; C22C 38/28; C22C 38/30; C22C 38/32; C22C 38/38; C22C 38/42; C22C 38/44; C22C 38/48; C22C 38/58; C22C 38/60; C22C 38/08; C22C 38/10; C22C 38/105; C22C 38/12; C22C 38/14; C22C 38/16; C22C 38/34; C22C 38/50; C22C 38/52; C22C 38/54; B32B 15/013; B32B 15/04; B32B 15/043; B32B 15/18; B32B 2311/20; C21D 1/185; C21D 1/19; C21D 1/25; C21D 1/26; C21D 1/76; C21D 8/0226; C21D 8/0263; C21D 8/0273; C21D 8/0426; C21D 8/0463; C21D 8/0473; C21D 9/46; C21D 9/48; C21D 2211/001; C21D 2211/002; C21D 2211/005; C21D 2211/008; C21D 2211/009; C23C 2/06; C23C 2/285; C23C 2/40; C23C 2/28; C23C 30/00; C23C 30/005; Y10T 428/12799; Y10T 428/12951; Y10T 428/12972

See application file for complete search history.

(56) References Cited

U.S. PATENT DOCUMENTS

2019/0226046 A1 7/2019 Toda et al.
2020/0024706 A1 1/2020 Nakano et al.
2020/0040435 A1 * 2/2020 Nakano .................. C22C 38/22

FOREIGN PATENT DOCUMENTS

JP 07-011383 A 1/1995
JP 07-207413 A 8/1995

(Continued)

*Primary Examiner* — Michael E. La Villa
(74) *Attorney, Agent, or Firm* — Renner, Otto, Boisselle & Sklar, LLP

(57) ABSTRACT

A steel sheet with a metallographic structure in a thickness ¼ portion includes, by volume percentage, ferrite: 10% or more and less than 50%, granular bainite: 5% or more and less than 40%, martensite: 30% or more and 55% or less, upper and lower bainite: less than 30% in total, pearlite: less than 10%, and residual austenite: less than 5%, a proportion of the number of the martensites adjacent to the ferrite to the number of the metallographic structures adjacent to the ferrite is 30% or less in the thickness ¼ portion, and the difference between the absolute maximum and minimum values of Vickers hardness at a load of 50 gf obtained at an interval of 30 μm from a position of a depth of 100 μm in a sheet thickness direction from a surface of the steel sheet to a thickness middle portion position is 60 HV or less.

12 Claims, 2 Drawing Sheets

(51) Int. Cl.

| | |
|---|---|
| ***B32B 15/04*** | (2006.01) |
| ***B32B 15/18*** | (2006.01) |
| ***C21D 1/18*** | (2006.01) |
| ***C21D 1/19*** | (2006.01) |
| ***C21D 1/25*** | (2006.01) |
| ***C21D 1/26*** | (2006.01) |
| ***C21D 1/76*** | (2006.01) |
| ***C21D 8/0221*** | (2026.01) |
| ***C21D 8/0247*** | (2026.01) |
| ***C21D 8/04*** | (2006.01) |
| ***C21D 9/46*** | (2006.01) |
| ***C21D 9/48*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |
| ***C22C 38/18*** | (2006.01) |
| ***C22C 38/20*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/30*** | (2006.01) |
| ***C22C 38/32*** | (2006.01) |
| ***C22C 38/34*** | (2006.01) |
| ***C22C 38/38*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/58*** | (2006.01) |
| ***C22C 38/60*** | (2006.01) |
| ***C23C 2/06*** | (2006.01) |
| ***C23C 2/28*** | (2006.01) |
| ***C23C 2/40*** | (2006.01) |
| ***C23C 30/00*** | (2006.01) |

(52) U.S. Cl.

CPC .............. *C22C 38/52* (2013.01); *C22C 38/54* (2013.01); *C22C 38/58* (2013.01); *C22C 38/60* (2013.01); *C23C 2/06* (2013.01); *C23C 2/28* (2013.01); *C23C 2/285* (2013.01); *C23C 2/40* (2013.01); *C23C 30/00* (2013.01); *C23C 30/005* (2013.01); *B32B 2311/20* (2013.01); *C21D 2211/001* (2013.01); *C21D 2211/002* (2013.01); *C21D 2211/005* (2013.01); *C21D 2211/008* (2013.01); *C21D 2211/009* (2013.01); *Y10T 428/12799* (2015.01); *Y10T 428/12951* (2015.01); *Y10T 428/12972* (2015.01)

(56) References Cited

FOREIGN PATENT DOCUMENTS

| | | | |
|---|---|---|---|
| JP | 2616350 | B | 6/1997 |
| WO | 2018/051402 | A1 | 3/2018 |
| WO | 2018/138898 | A1 | 8/2018 |

* cited by examiner

TEMPERATURE (°C)

900

Ac1+30

Ac1+20

Ac1

650

TIME

STEEL SHEET

TECHNICAL FIELD

The present invention relates to a steel sheet having excellent formability and a maximum tensile strength of 900 MPa or more, which is mainly used for vehicle components and the like.

BACKGROUND ART

In order to suppress an emission amount of carbon dioxide gas from a vehicle, attempts have been made to reduce a weight of a vehicle body while ensuring safety by using a high strength steel sheet. However, in general, when strength of a steel sheet is increased, formability is decreased. In a high strength steel sheet, it is difficult to achieve both strength and formability.

In addition, a vehicle member has a stress concentration portion such as a hole. When a steel sheet for a vehicle member is pressed, fracture is likely to occur at a stress concentration portion. Therefore, a steel sheet capable of imparting high deformability to a stress concentration portion is earnestly desired from the industry. However, deformability at a stress concentration portion also tends to decrease as the strength of a steel sheet increases.

In order to solve these problems, several means have been proposed.

For example, Patent Document 1 discloses that a metallographic structure of a steel sheet is a composite structure of ferrite, which is a soft structure, and martensite, which is a hard structure, thereby achieving both strength and elongation. However, since the metallographic structure of the steel sheet of Patent Document 1 is a combination of a soft structure and a hard structure, a hardness difference between both microstructures is large. When the hardness difference between the microstructures is large, voids are likely to be generated at an interface between the microstructures, and hole expandability may be impaired. Therefore, the steel sheet described in Patent Document 1 is required to have improved hole expandability.

Patent Document 2 discloses that a metallographic structure of a steel sheet is a single microstructure of upper bainite or lower bainite having hardness between ferrite and martensite, thereby reducing a hardness difference between the microstructures and enhancing strength and hole expandability. However, since upper bainite or lower bainite is a microstructure composed of bainitic ferrite containing many dislocations and hard cementite, the steel sheet of Patent Document 2 is required to have improved elongation.

Patent Document 3 discloses that a metallographic structure of a steel sheet is composed of ferrite, upper bainite or lower bainite, and martensite, thereby reducing a hardness difference between the microstructures, and suppressing deterioration of elongation while ensuring strength and hole expandability. However, since upper bainite or lower bainite is composed of bainitic ferrite containing many dislocations and hard cementite, the steel sheet of Patent Document 3 is required to have improved elongation.

Patent Document 4 discloses that by forming a metallographic structure having hard martensite, soft ferrite, and granular bainite having hardness between martensite and ferrite, a hardness difference between the microstructures is reduced, and high strength, elongation, and hole expandability are obtained. Patent Document 5 discloses a steel sheet having a predetermined chemical composition and having a metallographic structure represented by, by area fraction, ferrite: 30% to 50%, granular bainite: 5% to 20%, martensite: 30% to 55%, bainite: less than 35%, and residual austenite and pearlite: 10% or less in total. However, according to findings of the present inventors, in the techniques disclosed in Patent Documents 4 and 5, a cooling rate after hot rolling and a heating rate at the time of annealing are not optimized. Therefore, the steel sheets disclosed in Patent Documents 4 and 5 are poor in deformability at a stress concentration portion.

CITATION LIST

Patent Document

Patent Document 1: Japanese Unexamined Patent Application, First Publication No. H07-011383

Patent Document 2: Japanese Patent Publication No. 2616350

Patent Document 3: Japanese Unexamined Patent Application, First Publication No. H07-207413

Patent Document 4: PCT International Publication No. WO 2018/051402

Patent Document 5: PCT International Publication No. WO 2018/138898

SUMMARY OF INVENTION

Technical Problems to be Solved by the Invention

An object of the present invention is to provide a steel sheet having all of strength, formability, and deformability at a stress concentration portion at a high level.

Means for Solving the Problem

The gist of the present invention is as follows.

(1) A steel sheet according to one aspect of the present invention includes a chemical composition including, by mass %, C: 0.07% or more and 0.15% or less, Si+Al: 0.20% or more and 2.50% or less, Mn+Cr: 1.20% or more and 4.00% or less, P: 0% or more and 0.040% or less, S: 0% or more and 0.010% or less, N: 0% or more and 0.010% or less, O: 0% or more and 0.006% or less, Mo: 0% or more and 0.50% or less, Ti: 0% or more and 0.20% or less, Nb: 0% or more and 0.20% or less, B: 0% or more and 0.010% or less, V: 0% or more and 0.50% or less, Cu: 0% or more and 1.00% or less, W: 0% or more and 0.10% or less, Ta: 0% or more and 0.10% or less, Ni: 0% or more and 1.00% or less, Sn: 0% or more and 0.050% or less, Co: 0% or more and 0.50% or less, Sb: 0% or more and 0.050% or less, As: 0% or more and 0.050% or less, Mg: 0% or more and 0.050% or less, Ca: 0% or more and 0.040% or less, Y: 0% or more and 0.050% or less, Zr: 0% or more and 0.050% or less, La: 0% or more and 0.050% or less, and Ce: 0% or more and 0.050% or less, wherein a remainder includes Fe and impurities, a metallographic structure in a thickness ¼ portion includes, by volume percentage, ferrite: 10% or more and less than 50%, granular bainite: 5% or more and less than 40%, martensite: 30% or more and 55% or less, upper bainite and lower bainite: less than 30% in total, pearlite: less than 10%, and residual austenite: less than 5%, a proportion of the number of the martensites adjacent to the ferrite to the number of the metallographic structures adjacent to the ferrite is 30% or less in the thickness ¼ portion, and the difference between the absolute maximum value and the absolute minimum value of Vickers hardness at a load of 50 gf obtained at an interval of 30 μm from a position of a depth of 100 μm in a sheet thickness direction from a surface of the steel sheet as a starting point to a thickness middle portion position is 60 HV or less.

(2) In the steel sheet according to (1), the chemical composition may contain one or more selected from the group of, by mass %, Mo: 0.01% or more and 0.50% or less, Ti: 0.001% or more and 0.20% or less, Nb: 0.0001% or more and 0.20% or less, B: 0.0001% or more and 0.010% or less, V: 0.001% or more and 0.50% or less, Cu: 0.001% or more and 1.00% or less, W: 0.001% or more and 0.10% or less, Ta: 0.001% or more and 0.10% or less, Ni: 0.001% or more and 1.00% or less, Sn: 0.001% or more and 0.050% or less, Co: 0.001% or more and 0.50% or less, Sb: 0.001% or more and 0.050% or less, As: 0.001% or more and 0.050% or less, Mg: 0.0001% or more and 0.050% or less, Ca: 0.001% or more and 0.040% or less, Y: 0.001% or more and 0.050% or less, Zr: 0.001% or more and 0.050% or less, La: 0.001% or more and 0.050% or less, and Ce: 0.001% or more and 0.050% or less.

(3) In the steel sheet according to (1) or (2), a ratio Hv30/Hvi of Vickers hardness Hv30 at a load of 0.29 N at a position of a depth of 30 μm in the sheet thickness direction from the surface of the steel sheet to Vickers hardness Hvi at a load of 0.29 N in the thickness ¼ portion may be 0.8 or less, and a tensile strength may be 900 MPa or more.

(4) In the steel sheet according to any one of (1) to (3), the surface may have a hot-dip galvanized layer or a hot-dip zinc alloy-plated layer.

(5) In the steel sheet according to any one of (1) to (3), the surface may have a galvannealed layer.

Effects of the Invention

According to the present invention, it is possible to provide a steel sheet which is suitable as a structural member of a vehicle or the like, has formability and deformability at a stress concentration portion, and has a high tensile strength of 900 MPa or more.

BRIEF DESCRIPTION OF THE DRAWINGS

FIG. 1 is an explanatory diagram showing a state in which granular bainite is generated.

FIG. 2-1 is a temperature-time graph schematically showing heating conditions before annealing of the steel sheet according to the present embodiment.

FIG. 2-2 is a temperature-time graph schematically showing cooling conditions after annealing of the steel sheet according to the present embodiment.

EMBODIMENT OF THE INVENTION

Figures 1, 2:
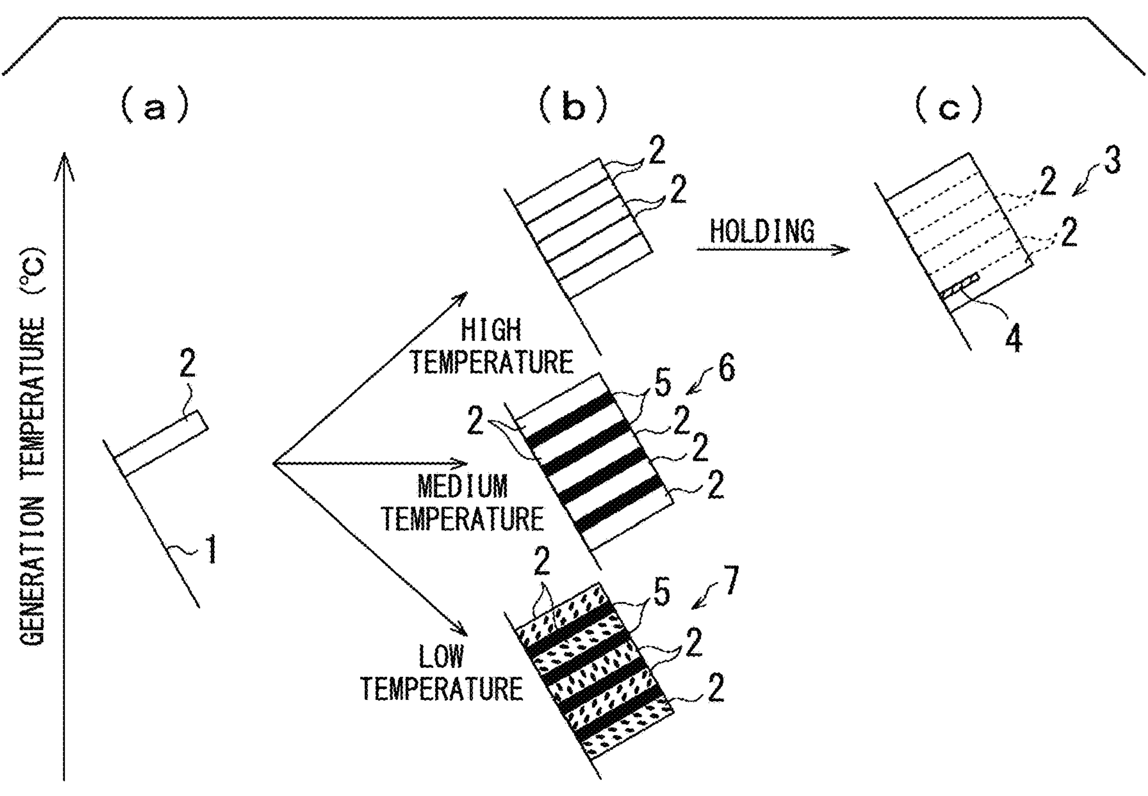
Figure 2:
Figure 2:
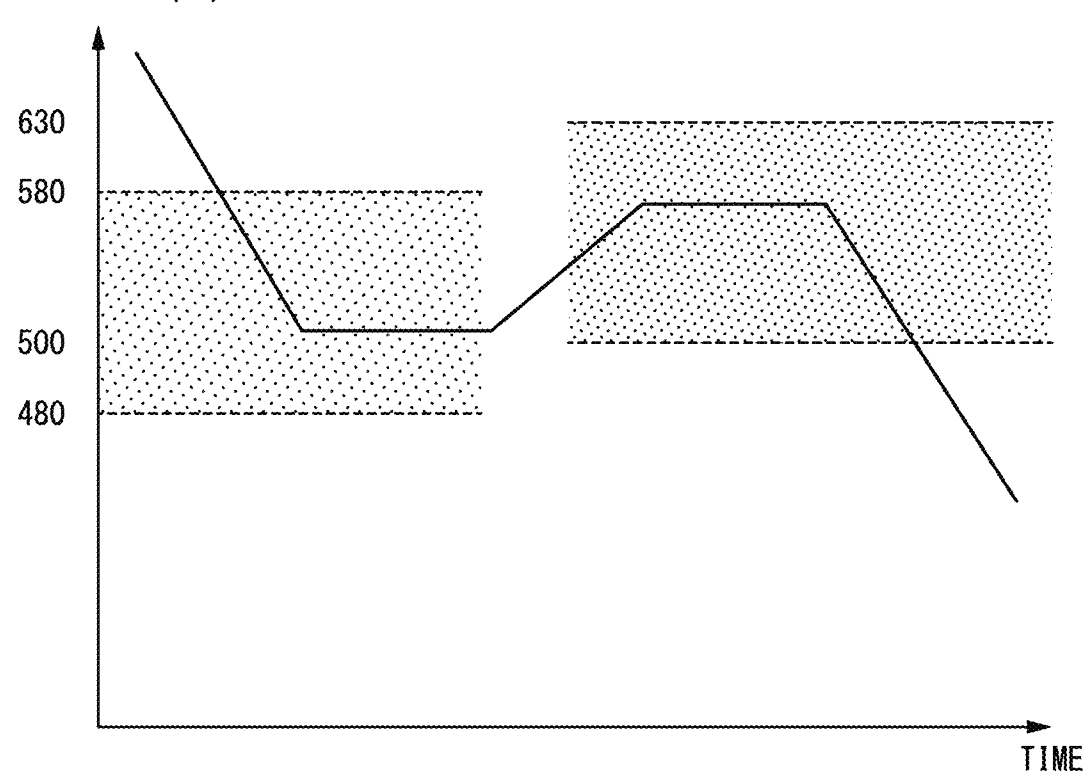

The present inventors have found that it is preferable to form a steel sheet into metallographic structures having martensite, ferrite, and granular bainite, and to control an arrangement of these metallographic structures. Specifically, the present inventors have found that by controlling a metallographic structure of a steel sheet such that granular bainite is arranged between ferrite and martensite, it is possible to reduce a portion having a large hardness difference. Thus, hole expandability of the steel sheet can be further improved. In addition, the present inventors have also found that deformability at a stress concentration portion can be further enhanced by applying a metallographic structure having a small hardness difference in a sheet thickness direction to a steel sheet.

In one embodiment of the present invention obtained based on the above findings, in a high strength steel sheet having a tensile strength of 900 MPa or more, both strength and formability are achieved by controlling a volume percentage of granular bainite and an arrangement of ferrite, martensite, and granular bainite.

Hereinafter, a steel sheet according to an aspect of the present invention will be described.

First, a metallographic structure of the steel sheet according to the present embodiment will be described. Hereinafter, since a microstructural fraction is expressed as a volume percentage, the unit "%" of the microstructural fraction means volume %. As will be described later, the metallographic structure is controlled in a thickness ¼ portion. The microstructural fractions described below all mean a value in a thickness ¼ portion.

Metallographic structure in thickness ¼ portion

Ferrite: 10% or more and less than 50%

Since ferrite is a soft microstructure, it is easily deformed, contributes to improvement in elongation, and acts to promote generation of granular bainite. When ferrite is 10% or more, transformation from austenite to granular bainite easily proceeds. Ferrite is preferably 12% or more, 15% or more, or 20% or more.

In order to ensure tensile strength, ferrite is set to less than 50%. Ferrite is preferably 40% or less, 35% or less, or 30% or less.

Granular bainite: 5% or more and less than 40%

Granular bainite is an aggregate of a plurality of lath-shaped bainitic ferrites. Granular bainite is characterized by a low dislocation density. For example, a dislocation density of granular bainite is on the order of about $10^{13}$ $m/m^3$. The difference (crystal orientation difference) in an angle of a crystal orientation of bainitic ferrite at a grain boundary between these bainitic ferrites is as small as 5° or less, and therefore granular bainite is a microstructure that looks like one lump having a grain size of about 5 to 20 μm. This is because recovery proceeds by heat treatment, the crystal orientation difference at an interface between bainitic ferrites becomes about 5° or less, and the interface appears to disappear. Granular bainite may contain residual austenite, martensite, and the like inside. However, unlike upper bainite and lower bainite, granular bainite does not contain carbide inside. Granular bainite is therefore softer than general bainite and martensite, unlike general bainite. An example of a method of determining granular bainite is described in Kitajima et al., "Identification of ferrite and granular bainite using electron channeling contrast image" (CAMP-ISIJ, Vol. 26 (2013) 896).

Upper bainite is an aggregate of a plurality of lath-shaped bainitic ferrites, and is a microstructure in which carbide is contained at an interface of the bainitic ferrites, but no carbide is contained inside each bainitic ferrite. On the other hand, lower bainite is an aggregate of a plurality of lath-shaped bainitic ferrites similar to upper bainite, and is a microstructure in which carbide is contained at an interface of the bainitic ferrites, and also carbide arranged in a specific direction exists inside each bainitic ferrite.

In addition, since granular bainite is generated in a high temperature range, recovery proceeds therein. Therefore, granular bainite has a lower dislocation density than that of upper bainite and lower bainite although a dislocation lower microstructure exists. Therefore, granular bainite is harder than ferrite that does not contain a dislocation lower microstructure and has a low dislocation density, and is softer than upper bainite or lower bainite. Therefore, granular bainite has better elongation than general bainite.

In addition, granular bainite reduces a hardness difference between ferrite and martensite, and thus suppresses generation of voids from an interface between ferrite and martensite at the time of hole expansion.

It is to be noted that subgrains (regions surrounded by grain boundaries having a crystal orientation difference of about 5° or less) exist inside granular bainite, and thus granular bainite is also distinguished from polygonal ferrite, which is a microstructure not containing subgrains.

FIG. 1 schematically shows a state in which, in a cooling process, bainitic ferrite generated from a prior austenite grain boundary changes into granular bainite, upper bainite, and lower bainite according to the difference in generation temperature (° C.). As shown in FIG. 1(*a*), in each case, first, bainitic ferrite 2 is generated from prior austenite grain boundary 1 toward an inside of prior austenite grains. Further, as shown in FIG. 1(*b*), bainitic ferrite 2 is generated in a lath shape so as to be adjacent to the previously generated bainitic ferrite 2.

Here, when the generation temperature (° C.) is relatively high (described as high temperature in FIG. 1), carbide such as cementite is not contained at an interface between bainitic ferrites 2 generated in a lath shape. Then, by further holding at a relatively high temperature, recovery proceeds. As a result, the crystal orientation difference at an interface between the plurality of bainitic ferrites 2 generated in a lath shape becomes about 5° or less, and the interface appears to disappear. Granular bainite can be generated even when a cooling rate is lowered, but when granular bainite is generated by isothermal holding, progress of recovery is further promoted, and the disappearance of the interface becomes significant. In this way, as shown in FIG. 1(*c*), granular bainite 3, which is a microstructure that looks like one lump having a grain size of about 5 to 20 μm, is generated as an aggregate of a plurality of lath-shaped bainitic ferrites 2. Although a hard structure 4 of residual austenite or martensite may be contained inside the granular bainite 3, unlike upper bainite and lower bainite, no carbide is contained inside.

On the other hand, when the generation temperature (° C.) is lower than that when the granular bainite 3 is generated, upper bainite or lower bainite is generated. That is, when the generation temperature (° C.) is slightly lower than that when the granular bainite 3 is generated (described as medium temperature in FIG. 1), carbide 5 such as cementite is contained at an interface between bainitic ferrites 2 generated in a lath shape. In this case, no carbide is contained inside the bainitic ferrite 2, and upper bainite 6 is generated. In addition, when the generation temperature (° C.) is still lower (described as low temperature in FIG. 1), carbide 5 such as cementite is contained at an interface between bainitic ferrites 2 generated in a lath shape, and also carbide is contained inside the bainitic ferrite 2, so that lower bainite 7 is generated.

When granular bainite is 5% or more, an elongation improving effect and a void suppressing effect are obtained. Granular bainite is preferably 8% or more, 10% or more, or 15% or more.

By setting granular bainite to less than 40%, strength can be ensured. Granular bainite is preferably 35% or less, 32% or less, or 30% or less.

Martensite: 30% or More and 55% or Less

Since martensite is a hard structure having a high dislocation density, martensite is a microstructure that contributes to improvement in tensile strength. By setting martensite to 30% or more, a tensile strength of 900 MPa or more is ensured. Martensite is preferably 32% or more, 35% or more, or 40% or more.

When martensite is 55% or less, elongation and hole expandability can be ensured. Martensite is preferably 50% or less, 45% or less, or 42% or less.

Upper Bainite and Lower Bainite: Less than 30% in Total

Upper bainite and lower bainite (hereinafter, the term "bainite" may be used as a generic term for both) deteriorate elongation due to their high dislocation density. Specifically, bainite is composed of bainitic ferrite and cementite having a dislocation density of about $1.0\times10^{14}$ m/m$^3$. In addition, bainite has a large hardness difference from ferrite. Therefore, an interface between ferrite and bainite tends to be a starting point for voids, and deteriorates hole expandability. By setting upper bainite and lower bainite to less than 30% in total, elongation and hole expandability are ensured. Preferably, upper bainite and lower bainite are 25% or less, 20% or less, or 10% or less in total. It is not necessary to define the lower limit of the total amount of upper bainite and lower bainite, and for example, this may be defined as 0% or more, 0.2% or more, 0.5% or more, or 1.0% or more.

Pearlite: Less than 10%

Pearlite is a microstructure containing hard cementite, and serves as a starting point for generation of voids at the time of hole expansion, and deteriorates hole expandability. Therefore, pearlite is less than 10%. Pearlite is preferably 8% or less, 6% or less, or 5% or less. It is not necessary to define the lower limit of pearlite, and for example, pearlite may be defined as 0% or more, 0.2% or more, 0.5% or more, or 1.0% or more.

Residual Austenite: Less than 5%

Residual austenite is a microstructure that contributes to improvement in elongation by transformation induced plasticity (TRIP). However, martensite generated by transformation induced plasticity of residual austenite is very hard, serves as a starting point for generation of voids, and deteriorates hole expandability. Therefore, residual austenite is less than 5%. Residual austenite is preferably 4% or less, 3% or less, or 2% or less. It is not necessary to define the lower limit of residual austenite, and for example, residual austenite may be defined as 0% or more, 0.2% or more, 0.5% or more, or 1.0% or more.

In a region in a thickness ¼ portion, the proportion of the number of martensites adjacent to ferrite to the number of metallographic structures adjacent to ferrite is 30% or less In a hole expansion test, a region damaged by punching is further deformed, so that voids are generated and connected, leading to fracture. That is, in order to enhance hole expandability, it is necessary to suppress generation and connection of voids. When a hardness difference between adjacent metallographic structures is large, voids are likely to be generated at an interface between the metallographic structures. For example, voids are most likely to be generated at an interface between soft ferrite and hard martensite. In the steel of the present invention, in order to reduce a proportion of martensite adjacent to ferrite, granular bainite is controlled to be in contact with ferrite. As a result, the contact proportion between ferrite and martensite is reduced, and improvement in hole expandability can be expected. By setting the proportion of the number of martensites adjacent to ferrite to the number of metallographic structures adjacent to ferrite to 30% or less, hole expandability is greatly improved. Preferably, this number proportion is 28% or less, 25% or less, or 20% or less. The "number of metallographic structures adjacent to ferrite" means the number of all metallographic structures including martensite.

The difference between the absolute maximum value and the absolute minimum value of Vickers hardness at a load of 50 gf obtained at an interval of 30 μm from a position of a depth of 100 μm in a sheet thickness direction from a surface of a steel sheet as a starting point to a thickness middle portion position is 60 HV or less A metallographic structure inside a steel sheet is not uniformly dispersed in a sheet thickness direction, but a layer having a large number of hard structures and a layer having a small number of hard structures are often distributed in a band shape. This is because the concentration of an element particularly represented by manganese is biased when the concentration is measured along a sheet thickness direction. As described above, when there is a bias in an element concentration in a sheet thickness direction, and thus microstructure distribution is nonuniform, a hardness difference is likely to occur between a soft layer and a hard layer, which serves as a starting point for voids, and hole expandability is deteriorated.

By measuring hardness in a sheet thickness direction, using the difference between the absolute maximum value and the absolute minimum value as an index of hardness variation of a band-shaped microstructure, and setting the difference between the absolute maximum value and the absolute minimum value to 60 HV or less, deterioration of hole expandability can be suppressed, and further, deformability at a stress concentration portion can be enhanced. Preferably, the difference between the absolute maximum value and the absolute minimum value of hardness described above is 55 Hv or less, 50 hv, or less, or 30 Hv or less.

A ratio HV30/Hvi of Vickers hardness HV30 at a load of 0.29 N at a position of a depth of 30 μm in a sheet thickness direction from a surface of a steel sheet to Vickers hardness Hvi at a load of 0.29 N in a thickness ¼ portion: preferably 0.8 or less By making hardness of a sheet surface lower than hardness of an inner layer, bendability can be greatly improved. Therefore, in the steel sheet according to the present embodiment, an average value of Vickers hardness measured at five points at a load of 0.29 N at a position of a depth of 30 μm in a sheet thickness direction from a surface of the steel sheet is defined as Hv30, an average value of Vickers hardness measured at five points at a load of 0.29 N at a position of a thickness ¼ portion is defined as Hvi, and a ratio Hv30/Hvi may be 0.8 or less. By setting Hv30/Hvi to 0.8 or less, bendability of the steel sheet can be further enhanced. Hv30/Hvi may be 0.7 or less, 0.6 or less, or 0.5 or less.

Next, identification of ferrite, granular bainite, martensite, upper bainite, lower bainite, pearlite, and residual austenite, and calculation of a volume percentage will be described.

Identification of each metallographic structure and calculation of a volume percentage can be performed by observing a 100 μm×100 μm region of a cross section of a steel sheet parallel to a rolling direction and perpendicular to a sheet surface at a magnification of 1000 to 50000 times by electron back scattering diffraction (EBSD), X-ray measurement, corrosion using a nital reagent or a LePera solution, and a scanning electron microscope. Note that a volume percentage of any microstructure is measured at three measurement points, and an average value thereof is calculated.

The volume percentage of ferrite is determined by observing a 100 μm×100 μm region within a range of a sheet thickness of ⅛ to ⅜ centered on a sheet thickness of ¼ in an electron channeling contrast image by a scanning electron microscope. A value obtained by subtracting the volume percentage of granular bainite obtained by a method (EBSD) described later from the total area ratio of ferrite and granular bainite calculated by image analysis using image analysis software Image J is regarded as the volume percentage of ferrite. The electron channeling contrast image is an image displaying the crystal orientation difference of grains as the difference in contrast, and a portion having uniform contrast in the image (portion in which a lower microstructure such as a block or a packet, cementite, and residual austenite are not contained in grains and which appears in single uniform contrast) is ferrite. Means for discriminating between ferrite and granular bainite will be described later.

A volume percentage of residual austenite can be calculated by measuring diffraction intensity using X-rays.

In the measurement using X-rays, it is possible to remove a portion from a sheet surface of a sample to a depth of ¼ by mechanical polishing and chemical polishing, and calculate a microstructural fraction of residual austenite from an integrated intensity ratio of diffraction peaks of (200) and (211) of a bec phase and (200), (220), and (311) of an fcc phase using MoKα rays at a position of a sheet thickness of ¼. As a general calculation method, a five-peak method is used.

The volume percentage of martensite is determined by the following procedure. An observed section of a sample is etched with a LePera solution, and a 100 μm×100 μm region within the range of a sheet thickness of ⅛ to ⅜ centered on a sheet thickness of ¼ is observed with an FE-SEM. In LePera corrosion, since martensite and residual austenite are not corroded, the volume percentage of a non-corroded region is the total volume percentage of martensite and residual austenite. The volume percentage of martensite can be calculated by subtracting the volume percentage of residual austenite measured by X-ray from the volume percentage of the non-corroded region.

In addition, martensite can be distinguished from other microstructures in an electron channeling contrast image obtained by a scanning electron microscope. In the above image, a region having a high dislocation density and having a lower microstructure such as a block or a packet in grains is martensite.

Identification of upper bainite, lower bainite, and tempered martensite is performed by the following procedure. An observed section of a sample is corroded with a nital reagent, and a 100 μm×100 μm region within a range of a sheet thickness of ⅛ to ⅜ centered on a sheet thickness of ¼ is observed with an FE-SEM. Upper bainite, lower bainite, and tempered martensite can be discriminated from the position of cementite contained inside the microstructure and arrangement of cementite.

In upper bainite, cementite or residual austenite exists at an interface of lath-shaped bainitic ferrite. In lower bainite, cementite exists inside lath-shaped bainitic ferrite, a crystal orientation relationship between bainitic ferrite and cementite is one type, and cementite has the same variant. Based on these feature points, upper bainite and lower bainite can be identified.

Identification of pearlite is performed by the following procedure. An observed section of a sample is corroded with a nital reagent, and a range of a sheet thickness of ⅛ to ⅜ centered on a sheet thickness of ¼ is observed with an optical microscope. In the observation image of the optical microscope, a dark contrast region may be identified as pearlite, and a volume percentage of this region may be calculated based on image analysis.

Granular bainite is an aggregate of a plurality of lath-shaped bainitic ferrites and a microstructure that looks like one lump having a grain size of about 5 to 20 μm. This is because recovery proceeds by heat treatment, the crystal orientation difference at an interface between bainitic ferrite and bainitic ferrite becomes about 5° or less, and the interface appears to disappear. Although residual austenite or martensite may be contained inside granular bainite, unlike upper bainite and lower bainite, granular bainite does not contain carbide inside. In addition, since granular bainite is generated in a high temperature range, recovery proceeds therein. Therefore, granular bainite has a lower dislocation density than that of upper bainite and lower bainite although a dislocation lower microstructure exists. Therefore, granular bainite and ferrite cannot be distinguished from each other by a conventional corrosion method or secondary electron image observation using a scanning electron microscope.

As a result of studies by the present inventors, it has been found that granular bainite is composed of an aggregate of bainitic ferrite, and therefore has a minute crystal orientation difference within grains. It is possible to distinguish between granular bainite and ferrite by detecting a minute crystal orientation difference in grains. Using EBSD, the range of a sheet thickness of ⅛ to ⅜ centered on a sheet thickness of ¼ is observed at a step interval of 0.2 μm, and the value of grain average misorientation is calculated from the observation data. The observation is performed in a cross section parallel to a rolling direction and perpendicular to a sheet surface.

The value of grain average misorientation is a value obtained by calculating and averaging an orientation difference between adjacent pixels in a region surrounded by grain boundaries having grain boundaries different by 15° or more. By this method, it is possible to detect a minute crystal orientation difference of bainitic ferrite.

A region where the value of grain average misorientation is 0.5° or less includes ferrite and granular bainite. Therefore, a region obtained by removing a ferrite region where an electron channeling contrast image has a single uniform contrast from a region where the value of grain average misorientation is 0.5° or less is granular bainite. The value of an area fraction calculated by image analysis is taken as the volume percentage of granular bainite.

In a 100 μm×100 μm region in a thickness ¼ portion, a proportion of a metallographic structure adjacent to ferrite being martensite is 30% or less Using EBSD, a 100 μm×100 μm region in a thickness ¼ portion is observed at a step interval of 0.2 μm. The observation is performed in a cross section parallel to a rolling direction and perpendicular to a sheet surface. From the observation data, the value of grain average misorientation is calculated. Next, a region where the value of grain average misorientation is 0.5° or less is observed in an electron channeling contrast image to identify ferrite. Furthermore, martensite is identified among metallographic structures adjacent to ferrite. A metallographic structure in which a lower microstructure is recognized in a white color tone is martensite. The number of metallographic structures adjacent to ferrite and a proportion of the number of martensites to the number of metallographic structures adjacent to ferrite are calculated.

"The difference between the absolute maximum value and the absolute minimum value of Vickers hardness at a load of 50 gf obtained at an interval of 30 μm from a position of a depth of 100 μm in a sheet thickness direction from a surface of a steel sheet as a starting point to a thickness middle portion position" is determined as follows. First, Vickers hardness is continuously measured at an indentation load of 50 gf at an interval of 30 μm along a sheet thickness direction from a position of 100 μm in the sheet thickness direction from a surface of a steel sheet as a starting point. The difference between the absolute maximum value and the absolute minimum value of a plurality of hardness measurement values thus obtained is calculated. The interval between the measurement points arranged in the sheet thickness direction is preferably a distance four times or more an indentation if possible. In the present specification, the "distance four times or more an indentation" means a distance four times or more a length of a diagonal line of a rectangular opening of indentation generated by a diamond indenter at the time of measuring Vickers hardness.

Next, a reason for limiting a composition of the steel sheet according to the present embodiment will be described. Hereinafter, % related to the composition means mass %.

Composition

C: 0.07% or More and 0.15% or Less

C is an element that ensures a predetermined amount of martensite and improves strength of a steel sheet. When C is less than 0.07%, it is difficult to obtain a predetermined amount of martensite, and a maximum tensile strength of 900 MPa or more cannot be ensured, and thus C is set to 0.07% or more. C is preferably 0.09% or more, 0.10% or more, or 0.12% or more.

On the other hand, when C exceeds 0.15%, generation of ferrite is suppressed and elongation decreases, and thus C is set to 0.15% or less. C is preferably 0.14% or less, 0.13% or less, or 0.12% or less.

Si+Al: 0.20% or More and 2.50% or Less

Si and Al are essential elements for obtaining a predetermined amount of granular bainite. Granular bainite is a metallographic structure in which dislocations existed at an interface of bainitic ferrite are recovered by heat treatment, whereby the bainitic ferrite becomes a lump.

Therefore, once cementite is generated at an interface of bainitic ferrite, granular bainite cannot be obtained. Si and Al are elements that act to suppress generation of cementite.

When Si+Al (total of an Si content and an Al content) is less than 0.20%, operation and effects of suppressing generation of cementite cannot be sufficiently obtained, and it becomes difficult to obtain granular bainite at a predetermined area fraction. Therefore, Si+Al is 0.20% or more. Si+Al is preferably 0.25% or more, 0.30% or more, or 0.40% or more.

On the other hand, when Si+Al exceeds 2.50%, slab cracks occur due to excessive addition of Si and/or Al, and thus Si+Al is set to 2.50% or less. Si+Al is preferably 2.00% or less, 1.80% or less, or 1.60% or less.

Mn+Cr: 1.20% or More and 4.00% or Less

Mn and/or Cr are elements that contribute to improvement in strength, and are elements that act to suppress ferritic transformation that occurs during heat treatment in a continuous annealing facility or a continuous hot-dip galvanizing facility.

When Mn+Cr (total of an Mn content and a Cr content) is less than 1.20%, the effect is not sufficiently exhibited, ferrite exceeding a required area fraction is generated, and a tensile strength of 900 MPa or more cannot be obtained. Therefore, Mn+Cr is 1.20% or more. Mn+Cr is preferably 1.30% or more, 1.40% or more, or 1.50% or more. Mn+Cr is more preferably 1.80% or more.

On the other hand, when Mn+Cr exceeds 4.00%, ferritic transformation is excessively suppressed, a predetermined amount of ferrite cannot be ensured, and elongation decreases. Therefore, Mn+Cr is 4.00% or less. Mn+Cr is preferably 3.00% or less, 2.70% or less, or 2.50% or less.

P: 0% or More and 0.040% or Less

P is an impurity element that is segregated at a center portion of a sheet thickness of a steel sheet to inhibit toughness and embrittles a weld. When P exceeds 0.040%, strength of a weld and hole expandability significantly decreases. Therefore, P is 0.040% or less. P is preferably 0.030% or less, 0.020% or less, or 0.010% or less.

A smaller amount of P is more preferable, and the lower limit is not particularly limited. A P content may be 0%. On the other hand, when P is reduced to less than 0.0001% in a practical steel sheet, a manufacturing cost is greatly increased, which is economically disadvantageous. Therefore, the lower limit of P may be 0.0001%, 0.0002%, or 0.0005%.

S: 0% or More and 0.010% or Less

S is an impurity element that inhibits weldability and also inhibits manufacturability during casting and hot rolling. S is also an element that forms coarse MnS and inhibits hole expandability. When S exceeds 0.010%, a decrease in weldability, a decrease in manufacturability, and a decrease in hole expandability become significant. Therefore, S is 0.010% or less. S is preferably 0.008% or less, 0.005% or less, or 0.004% or less.

A smaller amount of S is more preferable, and the lower limit is not particularly limited. An S content may be 0%. On the other hand, when S is reduced to less than 0.0001% in a practical steel sheet, a manufacturing cost is greatly increased, which is economically disadvantageous. Therefore, the lower limit of S may be 0.0001%, 0.0002%, or 0.0005%.

N: 0% or More and 0.010% or Less

N is an element that forms coarse nitride, inhibits bendability and hole expandability, and causes blowholes during welding. When N exceeds 0.010%, a decrease in hole expandability and generation of blowholes become significant. Therefore, N is 0.010% or less. The N content may be 0.008% or less, 0.006% or less, or 0.005% or less.

A smaller amount of N is more preferable, and the lower limit is not particularly limited. The N content may be 0%. On the other hand, when N is reduced to less than 0.0005% in a practical steel sheet, a manufacturing cost is greatly increased, which is economically disadvantageous. Therefore, the lower limit of N may be 0.0005%, 0.0008%, or 0.0010%.

O: 0% or More and 0.006% or Less

O is an element that forms coarse oxide, inhibits bendability and hole expandability, and causes blowholes during welding. When O exceeds 0.006%, a decrease in hole expandability and generation of blowholes become significant. Therefore, O is 0.006% or less. An O content may be 0.005% or less, 0.004% or less, or 0.002% or less.

A smaller amount of O is more preferable, and the lower limit is not particularly limited. The O content may be 0%. On the other hand, when O is reduced to less than 0.0005% in a practical steel sheet, a manufacturing cost is greatly increased, which is economically disadvantageous. Therefore, the lower limit of O may be 0.0005%, 0.0006%, or 0.0008%.

The composition of the steel sheet according to the present embodiment may contain, in addition to the above elements, one or two or more selected from the group consisting of Mo: 0% or more and 0.50% or less, Ti: 0% or more and 0.20% or less, Nb: 0% or more and 0.20% or less, B: 0% or more and 0.010% or less, V: 0% or more and 0.50% or less, Cu: 0% or more and 1.00% or less, W: 0% or more and 0.1% or less, Ta: 0% or more and 0.1% or less, Ni: 0% or more and 1.00% or less, Sn: 0% or more and 0.05% or less, Sb: 0% or more and 0.05% or less, As: 0% or more and 0.05% or less, Mg: 0% or more and 0.05% or less, Ca: 0% or more and 0.040% or less, Y: 0% or more and 0.05% or less, Zr: 0% or more and 0.05% or less, La: 0% or more and 0.05% or less, Ce: 0% or more and 0.05% or less for the purpose of improving properties. In the steel sheet according to the present embodiment, these are optional elements. In the steel sheet according to the present embodiment, the amount of these optional elements may be less than the lower limit (including 0%) described below for each of these optional elements.

Mo: 0 to 0.50%

Similar to Cr, Mo is an element that contributes to high-strengthening of a steel sheet. This effect can be obtained even in a trace amount. The amount of Mo may be 0%, but in order to obtain the above effect, the amount of Mo is preferably 0.01% or more, 0.02% or more, or 0.05% or more. On the other hand, when the amount of Mo exceeds 0.50%, coarse Mo carbide is formed, and cold formability of a steel sheet may decrease. Therefore, the amount of Mo is preferably 0.50% or less, 0.40% or less, or 0.20% or less.

Ti: 0 to 0.20%

Ti is an element important for controlling morphology of carbide. Ti may promote an increase in strength of ferrite. Ti is an element that may decrease formability of a steel sheet by forming coarse Ti oxide or TIN. Therefore, from the viewpoint of ensuring the formability of a steel sheet, a smaller amount of Ti is more preferable, and the amount of Ti is preferably 0.20% or less, 0.10% or less, or 0.05% or less, and may be 0%. However, reducing the amount of Ti to less than 0.001% leads to an excessive increase in a refining cost, and thus the lower limit of the amount of Ti may be 0.001%, 0.002%, or 0.003%.

Nb: 0 to 0.20%

Similar to Ti, Nb is an element effective for controlling morphology of carbide, and is also an element effective for refining a microstructure and improving toughness of a steel sheet. This effect can be obtained even in a trace amount. The amount of Nb may be 0%, but in order to obtain the above effect, the amount of Nb is preferably 0.0001% or more, 0.0005% or more, or 0.0010% or more. However, when the amount of Nb is too large, a large number of fine and hard Nb carbide is precipitated, which may cause an increase in strength and significant deterioration of ductility of a steel sheet, leading to a decrease in formability of the steel sheet. Therefore, the amount of Nb is preferably 0.20% or less, 0.15% or less, or 0.10% or less.

B: 0 to 0.010%

B is an element that suppresses generation of ferrite and pearlite in a cooling process from austenite and promotes generation of a low-temperature transformation microstructure such as bainite or martensite. In addition, B is an element useful for high-strengthening of steel. This effect can be obtained even in a trace amount. The amount of B may be 0%, but in order to obtain the above effect, the amount of B is preferably 0.0001% or more, 0.0005% or more, or 0.0010% or more. However, when the amount of B is too large, coarse B oxide is generated, the B oxide serves as a starting point for generation of voids during press forming, and formability of a steel sheet may decrease. Therefore, the amount of B is preferably 0.010% or less, 0.008% or less, or 0.005% or less. It should be noted that identification of B of less than 0.0001% requires careful attention to analysis. If the B content is below the lower limit of detection of an analyzer, the B content may be considered as 0%.

V: 0 to 0.50%

Similar to Ti and Nb, V is an element effective for controlling morphology of carbide, and is also an element effective for refining a microstructure and improving toughness of a steel sheet. The amount of V may be 0%, but in order to obtain the above effect, the amount of V is preferably 0.001% or more, 0.005% or more, or 0.010% or more. However, when the amount of V is too large, a large number of fine V carbide is precipitated, which may cause an increase in strength and a decrease in ductility of a steel material, leading to a decrease in formability of a steel sheet. Therefore, the amount of V is preferably 0.50% or less, 0.40% or less, or 0.30% or less.

Cu: 0 to 1.00%

Cu is an element that contributes to improvement in strength of a steel sheet. This effect can be obtained even in a trace amount. The amount of Cu may be 0%, but in order to obtain the above effect, the amount of Cu is preferably 0.001% or more, 0.005% or more, or 0.010% or more. However, when the amount of Cu is too large, red heat embrittlement may be caused, leading to a decrease in productivity in hot rolling. Therefore, the amount of Cu is preferably 1.00% or less, 0.80% or less, or 0.50% or less.

W: 0 to 0.10%

Similar to Nb and V, W is an element effective for controlling morphology of carbide and improving strength of a steel sheet. The amount of W may be 0%, but in order to obtain the above effect, the amount of W is preferably 0.001% or more, 0.005% or more, or 0.010% or more. On the other hand, when the amount of W is too large, a large number of fine W carbide is precipitated, which may cause an increase in strength and a decrease in ductility of a steel sheet, leading to a decrease in cold workability of the steel sheet. Therefore, the amount of W is preferably 0.10% or less, 0.08% or less, or 0.05% or less.

Ta: 0 to 0.10%

Similar to Nb, V, and W, Ta is an element effective for controlling morphology of carbide and improving strength of a steel sheet. The amount of Ta may be 0%, but in order to obtain the above effect, the amount of Ta is preferably 0.001% or more, 0.005% or more, or 0.010% or more. On the other hand, when the amount of Ta is too large, a large number of fine Ta carbide is precipitated, which may cause an increase in strength and a decrease in ductility of a steel sheet, leading to a decrease in cold workability of the steel sheet. Therefore, the amount of Ta is preferably 0.10% or less, more preferably 0.02% or less, and still more preferably 0.010% or less.

Ni: 0 to 1.00%

Ni is an element effective for improving strength of a steel sheet. The amount of Ni may be 0%, but in order to obtain the above effect, the amount of Ni is preferably 0.001% or more, 0.005% or more, or 0.010% or more. On the other hand, when the amount of Ni is too large, ductility of a steel sheet may decrease, leading to a decrease in formability. Therefore, the amount of Ni is preferably 1.00% or less, 0.80% or less, or 0.50% or less.

Sn: 0 to 0.050%

Sn is an element that can be contained in a steel sheet when scrap is used as a raw material of the steel sheet. Sn may cause a decrease in cold formability of a steel sheet due to embrittlement of ferrite. Therefore, a smaller amount of Sn is more preferable. The amount of Sn is preferably 0.050% or less, more preferably 0.040% or less, or 0.030% or less, and may be 0%. However, reducing the amount of Sn to less than 0.001% leads to an excessive increase in a refining cost, and thus the amount of Sn may be 0.001% or more, 0.005% or more, or 0.010% or more.

Co: 0 to 0.50%

Similar to Ni, Co is an element effective for improving strength of a steel sheet. The amount of Co may be 0%, but in order to obtain the above effect, the amount of Co is preferably 0.001% or more, 0.005% or more, or 0.010% or more. On the other hand, when the amount of Co is too large, ductility of a steel sheet may decrease, leading to a decrease in formability. Therefore, the amount of Co is preferably 0.50% or less, 0.40% or less, or 0.30% or less.

Sb: 0 to 0.050%

Similar to Sn, Sb is an element that can be contained in a steel sheet when scrap is used as a raw material of the steel sheet. Sb may be strongly segregated at a grain boundary, leading to embrittlement of the grain boundary, a decrease in ductility, and a decrease in cold formability. Therefore, a smaller amount of Sb is more preferable. The amount of Sb is preferably 0.050% or less, more preferably 0.040% or less, or 0.030% or less, and may be 0%. However, reducing the amount of Sb to less than 0.001% leads to an excessive increase in a refining cost, and thus the amount of Sb may be 0.001% or more, 0.005% or more, or 0.010% or more.

As: 0 to 0.050%

Similar to Sn and Sb, As is an element that can be contained in a steel sheet when scrap is used as a raw material of the steel sheet. As is an element that is strongly segregated at a grain boundary, and may cause a decrease in cold formability. Therefore, a smaller amount of As is more preferable. The amount of As is preferably 0.050% or less, more preferably 0.040% or less, or 0.030% or less, and may be 0%. However, reducing the amount of As to less than 0.001% leads to an excessive increase in a refining cost, and thus the amount of As may be 0.001% or more, 0.005% or more, or 0.010% or more.

Mg: 0 to 0.050%

Mg controls morphology of sulfide and oxide, and contributes to improvement in bending formability of a steel sheet. This effect can be obtained even in a trace amount. The amount of Mg may be 0%, but in order to obtain the above effect, the amount of Mg is preferably 0.0001% or more, 0.005% or more, or 0.010% or more. However, when the amount of Mg is too large, a decrease in cold formability may be caused due to formation of coarse inclusions. Therefore, the amount of Mg is preferably 0.050% or less, and more preferably 0.040% or less or 0.030% or less.

Ca: 0 to 0.040%

Similar to Mg, Ca is an element capable of controlling morphology of sulfide in a trace amount. The amount of Ca may be 0%, but in order to obtain the above effect, the amount of Ca is preferably 0.001% or more, 0.005% or more, or 0.010% or more. However, when the amount of Ca is too large, coarse Ca oxide is generated, and the Ca oxide can be a starting point for generation of cracks during cold forming. Therefore, the amount of Ca is preferably 0.040% or less, and more preferably 0.030% or less or 0.020% or less.

Y: 0 to 0.050%

Similar to Mg and Ca, Y is an element capable of controlling morphology of sulfide in a trace amount. The amount of Y may be 0%, but in order to obtain the above effect, the amount of Y is preferably 0.001% or more, 0.005% or more, or 0.010% or more. However, when the amount of Y is too large, coarse Y oxide is generated, and cold formability may decrease. Therefore, the amount of Y is preferably 0.050% or less, and more preferably 0.040% or less or 0.030% or less.

Zr: 0 to 0.050%

Similar to Mg, Ca, and Y, Zr is an element capable of controlling morphology of sulfide in a trace amount. The amount of Zr may be 0%, but in order to obtain the above effect, the amount of Zr is preferably 0.001% or more, 0.005% or more, or 0.010% or more. However, when the amount of Zr is too large, coarse Zr oxide is generated, and cold formability may decrease. Therefore, the amount of Zr is preferably 0.050% or less, and more preferably 0.040% or less or 0.030% or less.

La: 0 to 0.050%

La is an element effective for controlling morphology of sulfide in a trace amount. The amount of La may be 0%, but in order to obtain the above effect, the amount of La is preferably 0.001% or more, 0.005% or more, or 0.010% or more. However, when the amount of La is too large, La oxide is generated, and cold formability may decrease. Therefore, the amount of La is preferably 0.050% or less, and more preferably 0.040% or less or 0.030% or less.

Ce: 0 to 0.050%

Similar to La, Ce is an element capable of controlling morphology of sulfide in a trace amount. The amount of Ce may be 0%, but in order to obtain the above effect, the amount of Ce is preferably 0.001% or more, 0.005% or more, or 0.010% or more. However, Ce is an element that is strongly segregated at a grain boundary and causes a decrease in the number proportion of grain boundary carbide, and when the number proportion of grain boundary carbide decreases, formability of a steel sheet may decrease. Therefore, the amount of Ce is preferably 0.050% or less, and more preferably 0.040% or less or 0.030% or less.

In the composition of the steel sheet according to the present embodiment, a remainder excluding the above elements is Fe and impurities. The impurity is an element that is mixed from a steel raw material and/or in a steelmaking process and is allowed to exist as long as properties of the steel sheet according to the present embodiment are not impaired.

The steel sheet according to the present embodiment may have a plated layer. The plated layer of the steel sheet according to the present embodiment may be a hot-dip galvanized layer or a hot-dip zinc alloy-plated layer (plated layer composed of an alloy of zinc and an additional element such as Si and Al), or may be a galvannealed layer (alloyed plated layer) obtained by alloying these platings. In addition, it is not hindered that the steel sheet according to the present embodiment has another plated layer (for example, an aluminum-plated layer or the like).

The hot-dip galvanized layer and the hot-dip zinc alloy-plated layer are preferably plated layers containing less than 7 mass % of Fe, and the alloyed plated layer is preferably a plated layer containing 7 mass % or more and 15 mass % or less of Fe. In the hot-dip galvanized layer, the hot-dip zinc alloy-plated layer, and the alloyed plated layer, components other than zinc and Fe are not particularly limited, and various compositions can be adopted within a normal range.

Next, a manufacturing method of the steel sheet according to the present embodiment will be described.

The steel sheet according to the present embodiment is manufactured as follows. A cast slab having the composition of the steel sheet according to the present embodiment is subjected to the following steps:

(a-1) finish rolling is completed at 880° C. or more, (a-2) cooling is performed at an average cooling rate from a finish rolling completion temperature to a coiling temperature of 20° C./s or more, (a-3) hot rolling is performed so that the coiling temperature is 680° C. or less to obtain a hot-rolled steel sheet, (b) the hot-rolled steel sheet is subjected to pickling and then to cold rolling to obtain a cold-rolled steel sheet, then (c) the cold-rolled steel sheet is heated in which a heating rate in a temperature range of 650° C. or less is 0.7° C./s or more and 10° C./s or less, the heating rate is changed in a temperature range of 650° C. or more and the Ac1 point or less, and further heated in which a heating rate is 0.6° C./s or more and 2.0° C./s or less within an Ac1 point or more and (Ac1+20° C.) or less, (d) thereafter, heating is performed to a maximum heating temperature of (Ac1+30° C.) or more and 900° C. or less, and temperature holding is performed in the temperature range for 10 seconds or more and 500 seconds or less, (e) a slow cooling zone for cooling to a temperature range of 650° C. or more and 750° C. or less at a cooling rate of 0.5° C./s or more and 20° C./s or less is preferably provided, and the average cooling rate at 580° C. or more and 650° C. or less is set to 5° C./s or more, (f-1) cooling is performed to a first stay temperature in a temperature range of 480° C. or more and 580° C. or less, and the temperature is stayed in this temperature range for 10 seconds or more and 100 seconds or less, and (f-2) the temperature is stayed at a second stay temperature in a temperature range of 500° C. or more and 630° C. or less for 10 seconds or more and 500 seconds or less, then step (g) is performed when plating is performed, and cooling is performed to room temperature when plating is not performed.

(g) When plating is performed, after step (f-2), the steel sheet is cooled to (zinc plating bath temperature−40)° C. to (zinc plating bath temperature+50° C.), immersed in a hot-dip galvanizing bath to perform hot-dip galvanizing, and the hot-dip galvanized layer is subjected to alloying treatment as necessary.

(h) When tempering is performed, a steel sheet after staying, a steel sheet having hot-dip galvanizing or hot-dip zinc alloy plating, or a steel sheet having galvannealing is tempered in a temperature range of 500° C. or less. The tempering may be performed online, or may be performed offline after continuous annealing. When the tempering is performed online, during the cooling after step (f) or (g), cooling may be performed to a temperature range of room temperature or more and 300° C. or less and then heating may be performed to a temperature of 200° C. or more and 400° C. or less.

Hereinafter, step conditions will be described.

(a-1) Finish Rolling Completion Temperature: 880° C. Or More

The steel sheet according to the present embodiment contains a relatively large amount of an alloying element in order to ensure a maximum tensile strength of 900 MPa or more. Therefore, since it is necessary to increase a rolling load at the time of hot rolling, it is preferable to perform hot rolling at a high temperature. In hot rolling, a rough-rolled steel sheet may be joined to continuously perform hot rolling.

The finish rolling is completed at 880° C. or more. When a finish rolling completion temperature range is less than 880° C., there is a possibility that the rolling load becomes excessive and productivity is deteriorated, and thus the finish rolling completion temperature range is set to 880° C. or more. In addition, in the case of two-phase (austenite+ ferrite) temperature range rolling, a shape after hot rolling deteriorates, and subsequent sheet passing is not possible. An upper limit of the finish rolling completion temperature is not particularly defined, but when the finish rolling completion temperature is 950° C. or more, productivity is deteriorated, and thus the upper limit of the finish rolling completion temperature is preferably 950° C.

(a-2) Average Cooling Rate from Finish Rolling Completion Temperature to Coiling Temperature: 20° C./s or More Slabs manufactured by casting have center segregation and microsegregation. The microsegregation is extended in a rolling direction by rolling, and a concentrated region and a dilute region are alternately formed in a band shape along a sheet thickness direction. Such band-shaped element segregation is particularly significant in manganese, remains in the steel sheet even after subsequent steps, affects microstructure formation during continuous annealing, increases nonuniformity in the sheet thickness direction, and causes deterioration of formability.

When pearlitic transformation proceeds from completion of finish rolling to coiling, band-shaped segregation of elements confirmed in measurement along the sheet thickness direction of the steel sheet is promoted. This is because manganese is concentrated in cementite in pearlite, and the difference in manganese concentration confirmed by measurement along the sheet thickness direction is large as compared with the case where pearlitic transformation does not proceed. In order to prevent this, it is necessary to set an average cooling rate (value obtained by dividing difference between finish rolling completion temperature and coiling temperature by time required from end of finish rolling to start of coiling) from the finish rolling completion temperature to the coiling temperature to 20° C./s or more. The average cooling rate from the finish rolling completion temperature to the coiling temperature is preferably 50° C./s or more, and more preferably 100° C./s or more.

(a-3) Coiling Temperature: 680° C. Or Less

The hot-rolled steel sheet is wound in a temperature range of 680° C. or less. When the coiling temperature exceeds 680° C., pearlitic transformation proceeds, concentration difference of elements confirmed by measurement along the sheet thickness direction increases as described above, and formability after continuous annealing is deteriorated, so that a coiling temperature range is set to 680° C. or less. The coiling temperature is preferably 550° C. or less, and more preferably 450° C. or less. The lower limit of the coiling temperature is not particularly defined, but since it is technically difficult to coil at a temperature equal to or lower than room temperature, room temperature is a substantial lower limit.

(b) The hot-rolled steel sheet is subjected to pickling and then to cold rolling to obtain a cold-rolled steel sheet (hereinafter, referred to as a “steel sheet”).

After hot rolling, the steel sheet is subjected to pickling and cold rolling. These steps are not particularly limited. For example, pickling may be performed once, or may be performed a plurality of times as necessary. In the cold rolling, the number of rolling passes and a rolling reduction for each pass may be appropriately set within a range in which a rolling reduction of about 10% or more and 80% or less can be ensured.

In order to obtain a strength of 900 MPa or more, it is necessary to obtain a predetermined amount of hard structure. For this purpose, heating is performed by switching the heating rate as follows.

(c1) Heating is performed from room temperature to 650° C. at a heating rate of 0.7° C./s or more and preferably 10° C./s or less.

(c2) The heating rate is switched in a temperature range of 650° C. or more and an Ac1 point or less.

(c3) Heating is performed at a heating rate in a temperature range of the Ac1 point or more and the Ac1 point+20° C. of 0.6° C./s or more and 2° C./s or less.

The temperature range of the Ac1 point or more and the Ac1 point+20° C. is a time when austenite (γ microstructure) starts to be generated. When the heating rate in this temperature range is less than 0.6° C., austenite grain growth preferentially occurs in a portion where Mn is segregated. Therefore, austenite grains cannot be uniformly dispersed. On the other hand, when the heating rate in this temperature range is more than 2° C./s, generation of austenite is delayed due to so-called overheating, and austenite is generated in a high temperature range. In this case, rapid austenite growth occurs in a portion where Mn is segregated, and therefore austenite grains cannot be uniformly dispersed. For the above reason, it is necessary to perform heating at a heating rate in a temperature range of the Ac1 point or more and the Ac1 point+20° C. of 0.6° C./s or more and 2° C./s or less.

In the temperature range from room temperature to 650° C., the heating rate is set to 0.7° C./s or more and 10° C./s or less. By setting the heating rate to 0.7° C./s or more, recrystallization of ferrite can sufficiently proceed. However, when the heating rate is too high, it is expected that it becomes difficult to set the heating rate in the temperature range of the Ac1 point or more and the Ac1 point+20° C. to the above-described range. Therefore, the heating rate until the temperature of the steel sheet reaches 650° C. is preferably 10° C./s or less.

In addition, in order to set the heating rate in the temperature range of the Ac1 point or more and the Ac1 point+20° C. to 0.6° C./s or more and 2° C./s or less, switching of the heating rate needs to be started when the steel sheet temperature reaches a temperature range slightly lower than this temperature range. Specifically, it is necessary to switch the heating rate when the steel sheet temperature is in the temperature range of 650° C. or more and the Ac1 point or less. When a switching temperature is less than 650° C., a non-recrystallized region of ferrite grains remains, and elongation of a finally obtained steel sheet decreases. On the other hand, when the switching temperature exceeds the Ac1 point or less, the above-described overheating cannot be suppressed.

The “heating rate” is a concept different from an “average heating rate”. In the manufacturing method of the steel sheet according to the present embodiment, the heating rate of the temperature of the steel sheet needs to be always within the above range in the temperature range of the Ac1 point or more and Ac1+20° C. or less.

(d) Maximum heating temperature: Ac1+30° C. or more and 900° C. or less, and holding time: 10 seconds or more and 500 seconds or less In order to obtain a strength of 900 MPa or more, it is necessary to obtain a predetermined amount of hard structure. When the maximum heating temperature is less than Ac1+30° C. or the holding time is less than 10 seconds, generation of austenite during annealing is suppressed, a predetermined amount of hard structure cannot be obtained as a final microstructure, and the tensile strength of 900 MPa cannot be satisfied.

On the other hand, when an annealing temperature range exceeds 900° C. or the holding time exceeds 500 seconds, grain growth of austenite proceeds, ferritic transformation is excessively suppressed, a predetermined amount of ferrite cannot be obtained in a final microstructure, and ductility decreases, so that the annealing temperature range is set to 900° C. or less. The annealing temperature range is preferably 850° C. or less. The holding time means a time during which the temperature of the steel sheet is isothermally held at the maximum heating temperature.

An atmosphere for heating the steel sheet to within the above-described temperature range is not particularly limited, but for example, the steel sheet may be heated in an atmosphere having a dew point of −15° C. or more and 20° C. or less. As a result, decarburization of a sheet surface proceeds, and bendability of the steel sheet can be further enhanced. Furthermore, since oxidation of easily oxidizable elements of Si and Mn proceeds, plating adhesion can also be enhanced. Specifically, by setting the dew point at the time of heating the steel sheet to −15° C. or more, it is possible to suppress an external oxidation state of Si and Mn while appropriately advancing decarburization, and it is possible to ensure more favorable plating adhesion. The dew point at the time of heating the steel sheet is more preferably −10° C. or more. In addition, by setting the dew point at the time of heating the steel sheet to 20° C. or less, it is possible to suppress progress of excessive decarburization and oxidation of a base steel sheet itself that causes deterioration of a surface state of the steel sheet. The dew point at the time of heating the steel sheet is preferably −24° C. or less.

Means for controlling the atmosphere around the steel sheet is not particularly limited. For example, heating and temperature holding of the steel sheet may be performed in a heating furnace and a soaking furnace of a continuous annealing line, and an atmosphere in these furnaces may be controlled within the above-described ranges.

(e) Preferably, a slow cooling zone may be provided in a manufacturing line, in which the slow cooling zone cools the steel sheet to a temperature range of 650° C. or more and 750° C. or less at an average cooling rate of 0.5° C./s or more and 20° C./s or less after the steel sheet is held at the maximum heating temperature described above. However, when a slow cooling zone is provided, it is necessary to set the average cooling rate to 0.5° C./s or more. When the average cooling rate in the slow cooling zone is too small, an amount of ferrite is excessive, and tensile strength is insufficient. The average cooling rate is an average cooling rate in a temperature range from the maximum heating temperature to a steel sheet temperature at a slow cooling zone outlet. This is a value obtained by dividing the difference between the maximum heating temperature and the steel sheet temperature at the slow cooling zone outlet by a temperature until the steel sheet temperature decreases from the maximum heating temperature to the steel sheet temperature at the slow cooling zone outlet.

On the other hand, in the temperature range of 580° C. or more and 650° C. or less, the average cooling rate is set to 5° C./see or more regardless of the presence or absence of the above-described slow cooling zone. As a result, excessive generation of ferrite can be suppressed.

In the manufacturing method of the steel sheet according to the present embodiment, it is necessary to generate a predetermined amount of granular bainite. Therefore, it is necessary to control a temperature as follows after annealing.

(f-1) Cooling is performed to a first stay temperature in a temperature range of 480° C. or more and 580° C. or less, and the temperature is stayed in this temperature range for 10 seconds or more and 100 seconds or less, and (f-2) the temperature is stayed at a second stay temperature in a temperature range of 500° C. or more and 630° C. or less for 10 seconds or more and 500 seconds or less, and then cooling is performed to room temperature.

The annealing is performed at a maximum heating temperature of Ac1+30° C. or more and 900° C. or less. After temperature holding at the maximum heating temperature is completed, first, the temperature of the steel sheet is decreased to a temperature range of 480° C. or more and 580° C. or less. At this time, the steel sheet may be cooled via the above-described slow cooling zone. Then, the temperature of the steel sheet is stayed at the first stay temperature in the temperature range of 480° C. or more and 580° C. or less for 10 seconds or more and 100 seconds or less. In the temperature range of 480° C. or more and 580° C. or less, no carbide is generated in the steel sheet, and bainitic ferrite is generated in the steel sheet. This makes it possible to further promote generation of granular bainite in subsequent heat treatment.

Further, after the temperature of the steel sheet is held at the first stay temperature in the temperature range of 480° C. or more and 580° C. or less for 10 seconds or more and 100 seconds or less, the temperature of the steel sheet is set in the temperature range of 500° C. or more and 630° C. or less. The steel sheet may be reheated as necessary. Then, the temperature of the steel sheet is stayed at the second stay temperature in the temperature range of 500° C. or more and 630° C. or less for 10 seconds or more and 500 seconds or less. As a result, a recovery phenomenon (phenomenon in which, by holding a metal at a high temperature, atoms diffuse, lattice defects move, despite introduction into bainitic ferrite during transformation, pair annihilation occurs, and a dislocation density inside the metal decreases) can be caused in bainitic ferrite. As a result, granular bainite is formed between ferrite and martensite, and the proportion of the number of martensites adjacent to ferrite can be set to 30% or less.

When a temperature holding time in the temperature range of 480° C. or more and 580° C. or less is insufficient and when a temperature holding time in the temperature range of 500° C. or more and 630° C. or less is insufficient, granular bainite is not sufficiently generated. On the other hand, when the temperature holding time in the temperature range of 480° C. or more and 580° C. or less exceeds and when the temperature holding time in the temperature range of 500° C. or more and 630° C. or less exceeds, granular bainite is excessively generated, and tensile strength greatly decreases.

(g) Plating and Alloying Step

If necessary, the steel sheet may be cooled to (zinc plating bath temperature-40)° C. to (zinc plating bath temperature+50)° C. and immersed in a hot-dip galvanizing bath or a hot-dip zinc alloy plating bath. After hot-dip galvanizing or a hot-dip zinc alloy plating bath is applied, hot-dip galvanizing or hot-dip zinc alloy plating may be subjected to alloying treatment. Since preferable conditions of the hot-dip galvanizing bath and the hot-dip zinc alloy plating bath are substantially the same, only the hot-dip galvanizing bath will be described below.

Cooling temperature range: (zinc plating bath temperature−40° C.) to (zinc plating bath temperature+50° C.)

In order to hot-dip galvanize the steel sheet in which a predetermined amount of granular bainite is generated by holding in step (f), the steel sheet is cooled to a temperature range near the zinc plating bath temperature, that is, a temperature range of (zinc plating bath temperature−40° C.) to (zinc plating bath temperature+50)° C.

If the cooling temperature range is less than (zinc plating bath temperature-40° C.), the temperature of the steel sheet is too low with respect to the temperature of the zinc plating bath, and the zinc plating bath temperature decreases due to the steel sheet entering the zinc plating bath, so that an appropriate zinc plating bath temperature cannot be maintained. Therefore, the cooling temperature range is set to (zinc plating bath temperature−40° C.) or more. The cooling temperature range is preferably (zinc plating bath temperature−20)° C. or more.

On the other hand, when the cooling temperature range exceeds (zinc plating bath temperature+50° C.), the steel sheet temperature is excessively high, the steel sheet enters the zinc plating bath, and at the same time, mutual diffusion of zinc and iron occurs vigorously on a sheet surface, so that an Fe concentration of the galvanized layer increases, leading to embrittlement. Therefore, the cooling temperature range is set to (zinc plating bath temperature+50)° C. or less. The cooling temperature range is preferably (zinc plating bath temperature+30° C.) or less.

The alloying treatment applied to the hot-dip galvanized layer is performed by heating the hot-dip galvanized layer to a normal heating temperature range, that is, 300 to 550° C.

(h) After step (f) or step (g), the steel sheet may be tempered. The tempering step may be a step of holding at a predetermined temperature or reheating during final cooling to room temperature, or may be a step of reheating to a predetermined temperature after final cooling is finished. The heating method in the tempering step is not particularly limited. However, from the viewpoint of suppressing a decrease in strength of the steel sheet, the holding temperature or the heating temperature in the tempering step is preferably 500° C. or less. The tempering may be performed online, or may be performed offline after continuous annealing. When the tempering is performed online, during the cooling after step (f) or (g), cooling may be performed to a temperature range of room temperature or more and 300° C. or less and then heating may be performed to a temperature of 200° C. or more and 400° C. or less.

EXAMPLES (Experiment 1)

Various slabs having chemical compositions described in Table 1-1 and Table 1-2 were used as materials, and various steel sheets were manufactured according to various manufacturing conditions described in Table 2-1 to Table 3-2.

In Table 1-1 and Table 1-2, the amounts of elements not added to a slab are indicated by blank. In addition, a unit of a component of each slab was mass %, and the remainder was iron and impurities.

The temperature holding time at the maximum heating temperature was set within a range of 10 seconds or more and 500 seconds or less under all manufacturing conditions. In addition, the rolling reduction at the time of cold rolling was within a range of 10 to 80% under all manufacturing conditions. The tempering temperature and the tempering time under manufacturing conditions in which tempering is not performed are indicated by blank. In the case of having plating, either a hot-dip galvanized layer or a hot-dip zinc alloy-plated layer is applicable.

With regard to a steel sheet, values outside the scope of the invention and values that failed to meet acceptance criteria were underlined. With regard to manufacturing conditions, values outside a range considered to be appropriate were underlined.

Manufacturing conditions described as "no slow cooling zone" in Table 2-1 and Table 2-2 are those in which two-stage cooling was not performed after temperature holding at a maximum heating temperature. The "average cooling rate until 500° C." under such manufacturing conditions means the average cooling rate from a maximum heating temperature to a stay temperature range (temperature at which the temperature stays). On the other hand, manufacturing conditions that are not described as "no slow cooling zone" in Table 2-1 and Table 2-2 are those in which two-stage cooling was performed after temperature holding at a maximum heating temperature. Under such manufacturing conditions, the "average cooling rate in a slow cooling zone" means the average cooling rate from the maximum heating temperature to a cooling stop temperature in a slow cooling zone, and the "average cooling rate until 500° C." means the average cooling rate from the cooling stop temperature in a slow cooling zone to the stay temperature range.

The metallographic structure in a thickness ¼ portion of these steel sheets, the proportion of the number of martensites adjacent to ferrite to the number of metallographic structures adjacent to ferrite in the thickness ¼ portion (described as "proportion of martensite adjacent to ferrite" in the tables), and the difference between the absolute maximum value and the absolute minimum value of Vickers hardness at a load of 50 gf obtained at an interval of 30 μm from a position of a depth of 100 μm in a sheet thickness direction from a surface of a steel sheet as a starting point to a thickness middle portion position (described as "maximum difference in hardness in sheet thickness direction" in the tables) were evaluated and described in Table 4-1 and Table 4-2. These evaluations were performed according to the above-described method.

Further, tensile strength (TS), normal elongation ($El_1$), processed part elongation ($El_2$) hole expandability (2), a, and workability of these steel sheets were evaluated and described in Table 5-1 and Table 5-2. These evaluation methods are as follows.

The tensile strength of a steel sheet was evaluated by taking a JIS5B test piece from the steel sheet so that a longitudinal direction was perpendicular to a rolling direction of the steel sheet, and performing a tensile test in accordance with JIS Z 2241:2011. A steel sheet having a tensile strength of 900 MPa or more was determined to be acceptable with respect to tensile strength.

Figure 3:
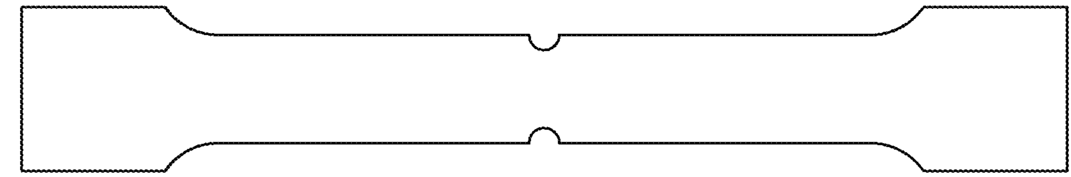
FIG. 3 is a schematic view showing a shape of a test piece for evaluation of processed part elongation $El_2$.

Elongation of a steel sheet was evaluated for both normal elongation ($El_1$) measured by a normal test piece and processed part elongation ($El_2$) measured by a test piece in which a stress concentration portion was formed. Similar to the evaluation of tensile strength, normal elongation $El_1$ (total elongation El) of a steel sheet was evaluated by taking a JIS5B test piece from the steel sheet so that a longitudinal direction was perpendicular to a rolling direction of the steel sheet, and performing a tensile test in accordance with JIS Z 2241:2011. A steel sheet having a normal elongation $El_1$ of 10.0% or more was determined to be acceptable with respect to elongation. Processed part elongation $El_2$ was evaluated in the following manner: a circular notch having a radius R30 was provided in a longitudinal center portion 5 of a JIS5B test piece taken from a steel sheet as shown in FIG. 3, and a tensile test was performed on this in the same manner as in the evaluation of normal elongation to measure total elongation. A steel sheet in which a value ($El_2/El_1$)

obtained by dividing processed part elongation $El_2$ by normal elongation $El_1$ was more than 0.280 was determined to be acceptable with respect to deformability at a stress concentration portion.

Hole expandability (λ) of a steel sheet was evaluated by performing a hole expansion test in accordance with JIS Z 2256:2010. A steel sheet having a hole expandability of 25.0% or more was determined to be acceptable with respect to hole expandability.

In the method of evaluating workability of a steel sheet, a steel sheet satisfying lower limits of the elongation and hole expandability described above and having an elongation×hole expandability (El×λ) of 300.0 or more was determined to be acceptable with respect to workability.

TABLE 1-1

| No. | C | Si + Al | Mn + Cr | P | S | N | B | Ti | Nb | V | O |
|---|---|---|---|---|---|---|---|---|---|---|---|
| 1 | 0.08 | 0.9 | 2.7 | 0.003 | 0.0017 | 0.001 | | | | | 0.001 |
| 2 | 0.13 | 0.4 | 1.5 | 0.002 | 0.0019 | 0.001 | 0.002 | | | | 0.002 |
| 3 | 0.10 | 0.5 | 2.1 | 0.004 | 0.0006 | 0.001 | | | | | 0.001 |
| 4 | 0.13 | 0.5 | 1.7 | 0.002 | 0.0009 | 0.001 | 0.001 | | 0.03 | | 0.001 |
| 5 | 0.12 | 0.6 | 1.4 | 0.004 | 0.0014 | 0.001 | 0.002 | 0.02 | | | 0.001 |
| 6 | 0.08 | 0.5 | 3.1 | 0.002 | 0.0011 | 0.002 | | | | | 0.001 |
| 7 | 0.11 | 0.3 | 3.5 | 0.004 | 0.0008 | 0.001 | | | | | 0.001 |
| 8 | 0.11 | 0.4 | 2.3 | 0.002 | 0.0010 | 0.001 | 0.001 | | | | 0.001 |
| 9 | 0.14 | 0.7 | 1.8 | 0.003 | 0.0012 | 0.002 | | | | | 0.001 |
| 10 | 0.13 | 0.6 | 2.5 | 0.003 | 0.0008 | 0.001 | 0.002 | 0.02 | 0.03 | | 0.001 |
| 11 | 0.11 | 0.6 | 2.8 | 0.004 | 0.0019 | 0.002 | | | | | 0.001 |
| 12 | 0.09 | 0.5 | 2.8 | 0.002 | 0.0009 | 0.001 | | | | | 0.001 |
| 13 | 0.08 | 0.4 | 1.8 | 0.004 | 0.0009 | 0.001 | | | | | 0.002 |
| 14 | 0.12 | 0.7 | 3.4 | 0.002 | 0.0012 | 0.001 | | 0.03 | | | 0.001 |
| 15 | 0.12 | 0.6 | 2.8 | 0.003 | 0.0004 | 0.001 | | | 0.02 | | 0.001 |
| 16 | 0.14 | 0.6 | 2.3 | 0.002 | 0.0005 | 0.001 | | | | | 0.003 |
| 17 | 0.12 | 0.5 | 2.5 | 0.003 | 0.0017 | 0.001 | | | | | 0.001 |
| 18 | 0.08 | 0.7 | 1.8 | 0.004 | 0.0004 | 0.002 | | | | | 0.001 |
| 19 | 0.08 | 0.5 | 1.7 | 0.002 | 0.0013 | 0.001 | | | | | 0.001 |
| 20 | 0.12 | 0.7 | 3.2 | 0.003 | 0.0013 | 0.001 | | 0.03 | | | 0.001 |
| 21 | 0.10 | 0.3 | 2.1 | 0.004 | 0.0016 | 0.001 | | | | | 0.002 |
| 22 | 0.10 | 0.4 | 2.8 | 0.003 | 0.0018 | 0.002 | | | | | 0.001 |
| 23 | 0.14 | 0.5 | 2.6 | 0.002 | 0.0008 | 0.001 | | | | | 0.001 |
| 24 | 0.09 | 0.5 | 2.2 | 0.002 | 0.0015 | 0.003 | | | | | 0.001 |
| 25 | 0.11 | 0.4 | 1.7 | 0.002 | 0.0013 | 0.001 | | | | 0.20 | 0.001 |
| 26 | 0.10 | 0.4 | 2.0 | 0.002 | 0.0014 | 0.002 | | | | | 0.001 |
| 27 | 0.11 | 0.4 | 2.3 | 0.002 | 0.0005 | 0.001 | | | | | 0.001 |
| 28 | 0.09 | 0.5 | 1.5 | 0.003 | 0.0007 | 0.002 | | | | | 0.001 |
| 29 | 0.14 | 0.4 | 1.6 | 0.003 | 0.0015 | 0.001 | 0.002 | | | | 0.002 |
| 30 | 0.08 | 0.3 | 2.0 | 0.003 | 0.0012 | 0.002 | | | | | 0.001 |
| 31 | 0.10 | 0.4 | 2.8 | 0.002 | 0.0007 | 0.002 | | | | | 0.002 |
| 32 | 0.08 | 0.7 | 2.6 | 0.012 | 0.0079 | 0.002 | | | | | 0.002 |
| 33 | 0.12 | 2.2 | 1.9 | 0.009 | 0.0023 | 0.007 | | | | | 0.002 |
| 34 | 0.10 | 1.7 | 1.9 | 0.002 | 0.0065 | 0.005 | | | | | 0.002 |
| 35 | 0.09 | 1.0 | 2.6 | 0.003 | 0.0076 | 0.003 | | 0.02 | 0.03 | | 0.002 |
| 36 | 0.08 | 1.3 | 1.8 | 0.007 | 0.0067 | 0.006 | | | | | 0.002 |
| 37 | 0.12 | 0.9 | 2.3 | 0.003 | 0.0023 | 0.009 | | | | | 0.002 |
| 38 | 0.11 | 0.6 | 1.9 | 0.006 | 0.0059 | 0.006 | | | | | 0.002 |
| 39 | 0.09 | 0.5 | 2.2 | 0.010 | 0.0088 | 0.003 | | | | | 0.002 |
| 40 | 0.11 | 0.5 | 2.0 | 0.012 | 0.0042 | 0.007 | | | | | 0.002 |
| 41 | 0.10 | 0.8 | 3.8 | 0.016 | 0.0023 | 0.008 | 0.002 | | | | 0.002 |
| 42 | 0.13 | 1.9 | 2.5 | 0.017 | 0.0061 | 0.003 | | | | | 0.002 |
| 43 | 0.15 | 1.5 | 2.9 | 0.018 | 0.0035 | 0.001 | | | | | 0.002 |
| 44 | 0.11 | 1.2 | 2.0 | 0.014 | 0.0025 | 0.004 | | | | | 0.002 |
| 45 | 0.05 | 0.5 | 2.7 | 0.004 | 0.0003 | 0.002 | | | | | 0.002 |
| 46 | 0.22 | 0.4 | 2.3 | 0.002 | 0.0004 | 0.001 | | | | | 0.001 |
| 47 | 0.14 | 0.1 | 1.7 | 0.002 | 0.0008 | 0.001 | | | | | 0.001 |
| 48 | 0.11 | 2.7 | 2.3 | 0.002 | 0.0017 | 0.001 | | | | | 0.001 |
| 49 | 0.10 | 0.4 | 1.1 | 0.004 | 0.0016 | 0.001 | | | | | 0.003 |
| 50 | 0.08 | 0.6 | 4.3 | 0.002 | 0.0013 | 0.002 | | | | | 0.001 |
| 51 | 0.10 | 2.3 | 2.9 | 0.002 | 0.0090 | 0.003 | | 0.008 | | | 0.002 |

TABLE 1-2

| No. | Mo | Co | Ni | Cu | W | Ta | Sn | Sb | As | Mg | Ca | Y | Zr | La | Ce |
|---|---|---|---|---|---|---|---|---|---|---|---|---|---|---|---|
| 1 | | | | | | | | | | | | | | | |
| 2 | 0.05 | | | | | | | | | | | | | | |
| 3 | | | | | | | | | | | | | | | |
| 4 | | | | | | | | | | | | | | | |
| 5 | 0.04 | | | | | | | | | | | | | | |
| 6 | | | | | | | | | | | | | | | |
| 7 | | | | | | | | | | | | | | | |
| 8 | | | | | | | | | | | | | | | |

TABLE 1-2-continued

| No. | Mo | Co | Ni | Cu | W | Ta | Sn | Sb | As | Mg | Ca | Y | Zr | La | Ce |
|---|---|---|---|---|---|---|---|---|---|---|---|---|---|---|---|
| 9 | | | 0.20 | | | | | | | | | | | | |
| 10 | 0.05 | | | | | | | | | | | | | | |
| 11 | | | | | | | | | | | | | | | |
| 12 | | | | | | | | | 0.01 | | | | | | |
| 13 | | | | | | | | | | | | | | | |
| 14 | | | | | | | | | | | | | | | |
| 15 | | | | | | | 0.02 | | | | 0.001 | | | | |
| 16 | | | | | | | | | | | | | | | |
| 17 | | | | | | | | 0.02 | | | | | | | |
| 18 | | | | | | 0.05 | | | | | | | | | |
| 19 | | | | | | | | | | 0.02 | | | | | 0.02 |
| 20 | | | | | 0.02 | | | | | | | | | | |
| 21 | | | | | | | | | | | | | | | |
| 22 | | | | 0.50 | | | | | | | | | | | |
| 23 | | | | | | | | | | | | | | | |
| 24 | | | | | | | | | | | | | | | |
| 25 | | | | | | | | | | | | | | | |
| 26 | | | | | | | | | | | | | | | |
| 27 | | 0.10 | | | | | | | | | | | | | |
| 28 | 0.05 | | | | | | | | | | | | 0.01 | | |
| 29 | | | | | | | | | | | | | | | |
| 30 | | | | | | | | | | | | | | 0.01 | |
| 31 | | | | | | | | | | | | | | | |
| 32 | | | | | | | | | | | | | | | |
| 33 | | | | | | | | | | | | | | | |
| 34 | | | | | | | | | | | | | | | |
| 35 | | | | | | | | | | | | | | | |
| 36 | | | | | | | | | | | | | | | |
| 37 | | | | | | | | | | | | | | | |
| 38 | | | | | | | | | | | | 0.03 | | | |
| 39 | | | | | | | | | | | | | | | |
| 40 | | | | | | | | | | | | | | | |
| 41 | | | | | | | | | | | | | | | |
| 42 | | | | | | | | | | | | | | | |
| 43 | | | | | | | | | | | | | | | |
| 44 | | | | | | | | | | | | | | | |
| 45 | | | | | | | | | | | | | | | |
| 46 | | | | | | | | | | | | | | | |
| 47 | | | | | | | | | | | | | | | |
| 48 | | | | | | | | | | | | | | | |
| 49 | | | | | | | | | | | | | | | |
| 50 | | | | | | | | | | | | | | | |
| 51 | | | | | | | | | | | | | | | |

TABLE 2-1

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Maximum heating temperature | Cooling stop temperature in slow cooling zone | Average cooling rate in slow cooling zone | Cooling rate at 580° C. or more |
|---|---|---|---|---|---|---|---|---|---|---|
| A | 919 | 32 | 180 | 2.8 | 650 | 0.7 | 800 | No slow cooling zone | | 32 |
| B | 935 | 76 | 164 | 3.7 | 670 | 0.7 | 790 | No slow cooling zone | | 34 |
| C | 899 | 65 | 351 | 3.5 | 670 | 0.7 | 790 | No slow cooling zone | | 24 |
| D | 944 | 35 | 202 | 5.0 | 670 | 0.7 | 790 | No slow cooling zone | | 27 |
| E | 924 | 30 | 473 | 3.5 | 670 | 0.7 | 820 | No slow cooling zone | | 27 |
| F | 924 | 53 | 264 | 4.9 | 670 | 0.7 | 810 | No slow cooling zone | | 28 |
| G | 932 | 30 | 497 | 0.7 | 670 | 0.7 | 830 | No slow cooling zone | | 24 |
| H | 926 | 39 | 344 | 8.3 | 670 | 1.0 | 800 | No slow cooling zone | | 32 |
| I | 909 | 58 | 549 | 5.3 | 670 | 1.0 | 790 | No slow cooling zone | | 24 |
| J | 902 | 45 | 530 | 4.3 | 670 | 1.0 | 820 | No slow cooling zone | | 22 |

TABLE 2-1-continued

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Maximum heating temperature | Cooling stop temperature in slow cooling zone | Average cooling rate in slow cooling zone | Cooling rate at 580° C. or more |
|---|---|---|---|---|---|---|---|---|---|---|
| K | 889 | 94 | 594 | 3.0 | 670 | 1.0 | 830 | No slow cooling zone | | 25 |
| L | 938 | 69 | 430 | 6.6 | 680 | 1.0 | 747 | 636 | 2.1 | 33.0 |
| M | 921 | 89 | 239 | 5.8 | 680 | 1.0 | 800 | No slow cooling zone | | 32 |
| N | 910 | 56 | 415 | 5.9 | 680 | 1.0 | 820 | No slow cooling zone | | 23 |
| O | 887 | 76 | 596 | 5.1 | 680 | 1.0 | 820 | No slow cooling zone | | 30 |
| P | 920 | 41 | 305 | 6.5 | 680 | 1.0 | 832 | No slow cooling zone | | 31 |
| Q | 900 | 43 | 272 | 1.6 | 680 | 1.6 | 812 | No slow cooling zone | | 32 |
| R | 912 | 51 | 339 | 9.1 | 680 | 1.6 | 830 | No slow cooling zone | | 29 |
| S | 929 | 74 | 585 | 7.0 | 680 | 1.6 | 792 | No slow cooling zone | | 22 |
| T | 898 | 27 | 543 | 2.1 | 680 | 1.6 | 797 | No slow cooling zone | | 26 |
| U | 912 | 84 | 450 | 5.7 | 680 | 1.6 | 799 | No slow cooling zone | | 28 |
| V | 901 | 73 | 310 | 8.4 | 680 | 1.6 | 850 | 680 | 1.5 | 30.0 |
| W | 906 | 44 | 436 | 8.2 | 680 | 1.6 | 812 | No slow cooling zone | | 31 |
| X | 928 | 64 | 123 | 5.3 | 680 | 1.6 | 835 | No slow cooling zone | | 28 |
| Y | 895 | 62 | 263 | 5.2 | 700 | 1.6 | 800 | No slow cooling zone | | 23 |

TABLE 2-2

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Maximum heating temperature | Cooling stop temperature in slow cooling zone | Average cooling rate in slow cooling zone | Cooling rate at 580° C. or more |
|---|---|---|---|---|---|---|---|---|---|---|
| Z | 924 | 51 | 606 | 2.1 | 700 | 1.6 | 799 | No slow cooling zone | | 29 |
| AA | 912 | 45 | 611 | 6.1 | 700 | 1.6 | 820 | No slow cooling zone | | 31 |
| AB | 938 | 64 | 529 | 8.9 | 700 | 2.0 | 820 | No slow cooling zone | | 29 |
| AC | 895 | 68 | 408 | 9.2 | 700 | 2.0 | 780 | No slow cooling zone | | 34 |
| AD | 934 | 85 | 332 | 5.2 | 700 | 2.0 | 800 | No slow cooling zone | | 32 |
| AE | 897 | 91 | 435 | 9.3 | 700 | 2.0 | 835 | No slow cooling zone | | 25 |
| AL | 830 | | | In addition to excessive rolling load, hot-rolled sheet shape defect made it impossible to perform test after hot rolling | | | | | | |
| AM | 893 | 17 | 571 | 5.1 | 670 | 1.6 | 850 | No slow cooling zone | | 29 |
| AN | 916 | 102 | 414 | 6.2 | 670 | 1.6 | 840 | No slow cooling zone | | 24 |
| AO | 941 | 45 | 702 | 6.6 | 670 | 1.6 | 820 | No slow cooling zone | | 29 |
| AP | 908 | 71 | 307 | 0.1 | 670 | 1.6 | 840 | No slow cooling zone | | 26 |
| AQ | 927 | 93 | 195 | 51.4 | 670 | 1.6 | 820 | No slow cooling zone | | 30 |
| AR | 896 | 50 | 284 | 9.0 | 670 | 1.6 | 700 | No slow cooling zone | | 28 |
| AS | 903 | 67 | 145 | 9.0 | 670 | 1.6 | 930 | No slow cooling zone | | 33 |
| AT | 917 | 88 | 324 | 9.0 | 670 | 1.6 | 787 | 637 | 0.1 | 33 |
| AU | 927 | 29 | 531 | 8.8 | 670 | 1.6 | 787 | 630 | 20.7 | 33 |

TABLE 2-2-continued

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Maximum heating temperature | Cooling stop temperature in slow cooling zone | Average cooling rate in slow cooling zone | Cooling rate at 580° C. or more |
|---|---|---|---|---|---|---|---|---|---|---|
| AV | 918 | 50 | 273 | 2.2 | 670 | 1.6 | 830 | No slow cooling zone | | 23 |
| AW | 929 | 52 | 455 | 1.7 | 670 | 1.6 | 820 | No slow cooling zone | | 25 |
| AX | 887 | 40 | 320 | 4.5 | 670 | 1.6 | 815 | No slow cooling zone | | 23 |
| AF | 890 | 32 | 561 | 4.9 | 670 | 1.6 | 810 | No slow cooling zone | | 26 |
| AG | 927 | 56 | 476 | 6.6 | 670 | 1.6 | 810 | No slow cooling zone | | 4 |
| AH | 898 | 36 | 401 | 6.2 | 670 | 1.6 | 816 | 650 | 2.9 | 102 |
| AI | 908 | 39 | 186 | 3.8 | 670 | 1.6 | 870 | No slow cooling zone | | 28 |
| AJ | 898 | 94 | 502 | 5.0 | 670 | 1.6 | 803 | No slow cooling zone | | 32 |
| AK | 929 | 40 | 289 | 5.0 | 670 | 1.6 | 800 | No slow cooling zone | | 41 |
| AY | 869 | 25 | 592 | 5.0 | 670 | 1.6 | 856 | 600 | 41 | 71.0 |
| AZ | 919 | 32 | 180 | 1 | 600 | 0.7 | 800 | No slow cooling zone | 32 | 32 |
| BA | 919 | 32 | 180 | 5 | 730 | 0.7 | 800 | No slow cooling zone | 32 | 32 |
| BB | 919 | 32 | 180 | 5 | 650 | 5.0 | 800 | No slow cooling zone | 32 | 32 |
| BC | 919 | 32 | 180 | 10 | 650 | 0.5 | 800 | No slow cooling zone | 32 | 4 |
| BD | 935 | 76 | 164 | 1 | 670 | 0.7 | 790 | No slow cooling zone | 34 | 34 |
| BE | 935 | 76 | 164 | 1 | 670 | 0.7 | 790 | No slow cooling zone | 34 | 34 |
| BF | 935 | 76 | 164 | 1 | 670 | 0.7 | 790 | No slow cooling zone | 34 | 34 |
| BG | 935 | 76 | 164 | 1 | 670 | 0.7 | 790 | No slow cooling zone | 34 | 34 |

TABLE 3-1

| No. | Staying time at 480 to 580° C. | Staying time at 500 to 630° C. | Whether plating was performed or not | Whether alloying was performed or not | Whether tempering was performed or not | Tempering temperature | Tempering time |
|---|---|---|---|---|---|---|---|
| A | 65 | 20 | Performed | Performed | Performed | 265 | 70 |
| B | 48 | 20 | Performed | Performed | Performed | 262 | 70 |
| C | 55 | 20 | Performed | Performed | Not performed | | |
| D | 68 | 20 | Performed | Performed | Performed | 261 | 72 |
| E | 35 | 20 | Performed | Performed | Performed | 262 | 27 |
| F | 26 | 20 | Performed | Performed | Performed | 257 | 87 |
| G | 35 | 20 | Performed | Performed | Not performed | | |
| H | 48 | 20 | Performed | Performed | Performed | 262 | 76 |
| I | 39 | 20 | Performed | Performed | Performed | 267 | 70 |
| J | 82 | 20 | Performed | Performed | Performed | 300 | 30 |
| K | 67 | 20 | Performed | Performed | Not performed | | |
| L | 28.0 | 20 | Performed | Performed | Performed | 252 | 22 |
| M | 48 | 20 | Performed | Performed | Performed | 253 | 93 |
| N | 37 | 20 | Performed | Performed | Performed | 268 | 55 |
| O | 39 | 20 | Performed | Performed | Not performed | | |
| P | 22 | 20 | Performed | Performed | Performed | 259 | 41 |
| Q | 45 | 20 | Not performed | Not performed | Performed | 257 | 61 |
| R | 54 | 20 | Performed | Performed | Performed | 267 | 46 |
| S | 62 | 20 | Performed | Performed | Performed | 262 | 66 |
| T | 57 | 20 | Performed | Performed | Not performed | | |
| U | 41 | 20 | Performed | Performed | Performed | 254 | 86 |
| V | 68.0 | 20 | Performed | Performed | Performed | 259 | 26 |
| W | 29 | 40 | Performed | Performed | Performed | 256 | 47 |
| X | 68 | 40 | Performed | Performed | Not performed | | |
| Y | 59 | 40 | Performed | Performed | Performed | 259 | 48 |

TABLE 3-2

| No. | Staying time at 480 to 580° C. | Staying time at 500 to 630° C. | Whether plating was performed or not | Whether alloying was performed or not | Whether tempering was performed or not | Tempering temperature | Tempering time |
|---|---|---|---|---|---|---|---|
| Z | 35 | 40 | Performed | Performed | Not performed | | |
| AA | 46 | 40 | Not performed | Not performed | Performed | 261 | 89 |
| AB | 37 | 40 | Performed | Performed | Performed | 263 | 49 |
| AC | 68 | 40 | Performed | Performed | Performed | 264 | 90 |
| AD | 55 | 40 | Performed | Performed | Performed | 262 | 67 |
| AE | 43 | 300 | Performed | Performed | Performed | 259 | 73 |
| AL | In addition to excessive rolling load, hot-rolled sheet shape defect made it impossible to perform test after hot rolling | | | | | | |
| AM | 49 | 40 | Performed | Performed | Performed | 255 | 64 |
| AN | 23 | 40 | Performed | Performed | Not performed | | |
| AO | 73 | 40 | Performed | Performed | Not performed | | |
| AP | 63 | 40 | Not performed | Not performed | Not performed | | |
| AQ | 72 | 40 | Performed | Performed | Performed | 252 | 50 |
| AR | 65 | 40 | Performed | Performed | Performed | 252 | 21 |
| AS | 23 | 40 | Performed | Performed | Not performed | | |
| AT | 23 | 40 | Performed | Performed | Not performed | | |
| AU | 23 | 40 | Performed | Performed | Performed | 262 | 24 |
| AV | 110 | 40 | Performed | Performed | Performed | 264 | 90 |
| AW | 39 | 40 | Performed | Performed | Not performed | | |
| AX | 8 | 40 | Performed | Performed | Performed | 253 | 20 |
| AF | 47 | 40 | Performed | Performed | Performed | 316 | 190 |
| AG | 62 | 40 | Performed | Performed | Performed | 265 | 147 |
| AH | 74 | 40 | Performed | Performed | Performed | 328 | 272 |
| AI | 3 | 40 | Performed | Performed | Performed | 321 | 160 |
| AJ | 400 | 40 | Performed | Performed | Performed | 332 | 56 |
| AK | 49 | 40 | Performed | Performed | Performed | 314 | 218 |
| AY | 49.0 | 40 | Not performed | Not performed | Not performed | | |
| AZ | 20 | 40 | Performed | Performed | Performed | 265 | 70 |
| BA | 20 | 40 | Performed | Performed | Performed | 265 | 70 |
| BB | 20 | 40 | Performed | Performed | Performed | 265 | 70 |
| BC | 20 | 40 | Performed | Performed | Performed | 265 | 70 |
| BD | 7 | 40 | Performed | Performed | Performed | 262 | 70 |
| BE | 20 | 5 | Performed | Performed | Performed | 262 | 70 |
| BF | 20 | 600 | Performed | Performed | Performed | 262 | 70 |
| BG | 0 | 0 | Performed | Performed | Performed | 262 | 70 |

TABLE 4-1

| Test No. | Steel No. | Manufacturing method No. | Ferrite | Granular bainite | Martensite | Upper bainite and lower bainite | Pearlite | Residual austenite | Total microstructure | Proportion of martensite adjacent to ferrite | Maximum difference in hardness in sheet thickness direction |
|---|---|---|---|---|---|---|---|---|---|---|---|
| NN-1 | 1 | A | 49 | 11 | 30 | 10 | 0 | 0 | 100 | 21 | 23 |
| NN-2 | 2 | B | 41 | 9 | 31 | 19 | 0 | 0 | 100 | 20 | 16 |
| NN-3 | 3 | C | 42 | 8 | 31 | 19 | 0 | 0 | 100 | 25 | 22 |
| NN-4 | 4 | D | 41 | 17 | 30 | 12 | 0 | 0 | 100 | 12 | 14 |
| NN-5 | 5 | E | 25 | 7 | 45 | 23 | 0 | 0 | 100 | 28 | 11 |
| NN-6 | 6 | F | 37 | 6 | 33 | 24 | 0 | 0 | 100 | 17 | 9 |
| NN-7 | 7 | G | 25 | 12 | 52 | 11 | 0 | 0 | 100 | 29 | 15 |
| NN-8 | 8 | H | 36 | 9 | 39 | 16 | 0 | 0 | 100 | 15 | 8 |
| NN-9 | 9 | I | 42 | 5 | 32 | 21 | 0 | 0 | 100 | 17 | 32 |
| NN-10 | 10 | J | 18 | 12 | 55 | 15 | 0 | 0 | 100 | 27 | 25 |
| NN-11 | 11 | K | 32 | 11 | 48 | 9 | 0 | 0 | 100 | 30 | 33 |
| NN-12 | 12 | L | 22 | 9 | 54 | 15 | 0 | 0 | 100 | 17 | 32 |
| NN-13 | 13 | M | 41 | 6 | 31 | 22 | 0 | 0 | 100 | 14 | 26 |
| NN-14 | 14 | N | 28 | 6 | 44 | 22 | 0 | 0 | 100 | 16 | 21 |
| NN-15 | 15 | O | 23 | 12 | 52 | 12 | 0 | 0 | 100 | 18 | 35 |
| NN-16 | 16 | P | 16 | 9 | 55 | 20 | 0 | 0 | 100 | 22 | 8 |
| NN-17 | 17 | Q | 26 | 8 | 52 | 13 | 0 | 0 | 100 | 30 | 7 |
| NN-18 | 18 | R | 38 | 12 | 35 | 15 | 0 | 0 | 100 | 11 | 14 |
| NN-19 | 19 | S | 44 | 16 | 30 | 10 | 0 | 0 | 100 | 13 | 43 |
| NN-20 | 20 | T | 42 | 9 | 30 | 19 | 0 | 0 | 100 | 29 | 16 |
| NN-21 | 21 | U | 36 | 14 | 39 | 11 | 0 | 0 | 100 | 13 | 35 |
| NN-22 | 22 | V | 19 | 12 | 54 | 15 | 0 | 0 | 100 | 17 | 24 |
| NN-23 | 23 | W | 21 | 9 | 54 | 16 | 0 | 0 | 100 | 13 | 15 |
| NN-24 | 24 | X | 16 | 15 | 55 | 14 | 0 | 0 | 100 | 21 | 13 |
| NN-25 | 25 | Y | 41 | 10 | 31 | 18 | 0 | 0 | 100 | 13 | 16 |

TABLE 4-2

| Test No. | Steel No. | Manufacturing method No. | Ferrite | Granular bainite | Martensite | Upper bainite and lower bainite | Pearlite | Residual austenite | Total microstructure | Proportion of martensite adjacent to ferrite | Maximum difference in hardness in sheet thickness direction |
|---|---|---|---|---|---|---|---|---|---|---|---|
| NN-26 | 26 | Z | 40 | 10 | 37 | 13 | 0 | 0 | 100 | 29 | 33 |
| NN-27 | 27 | AA | 19 | 6 | 54 | 20 | 0 | 0 | 100 | 25 | 32 |
| NN-28 | 28 | AB | 28 | 6 | 43 | 23 | 0 | 0 | 100 | 14 | 37 |
| NN-29 | 29 | AC | 42 | 10 | 30 | 18 | 0 | 0 | 100 | 11 | 28 |
| NN-30 | 30 | AD | 38 | 9 | 38 | 15 | 0 | 0 | 100 | 16 | 34 |
| NN-31 | 31 | AE | 15 | 12 | 55 | 18 | 0 | 0 | 100 | 17 | 33 |
| NN-32 | 32 | AL | Evaluation was impossible | | | | | | | | |
| NN-33 | 33 | AM | 48 | 12 | 26 | 11 | 0 | 4 | 100 | 63 | 64 |
| NN-34 | 34 | AN | 45 | 5 | 30 | 16 | 0 | 4 | 100 | 13 | 45 |
| NN-35 | 35 | AO | 40 | 13 | 36 | 10 | 0 | 0 | 100 | 54 | 65 |
| NN-36 | 36 | AP | 38 | 9 | 38 | 16 | 0 | 0 | 100 | 83 | 26 |
| NN-37 | 37 | AQ | 33 | 7 | 42 | 18 | 0 | 0 | 100 | 13 | 31 |
| NN-38 | 38 | AR | 100 | 0 | 0 | 0 | 0 | 0 | 100 | 0 | 13 |
| NN-39 | 39 | AS | 8 | 11 | 67 | 14 | 0 | 0 | 100 | 18 | 19 |
| NN-40 | 40 | AT | 58 | 14 | 17 | 11 | 0 | 0 | 100 | 17 | 32 |
| NN-41 | 41 | AU | 35 | 13 | 42 | 10 | 0 | 0 | 100 | 18 | 18 |
| NN-42 | 42 | AV | 45 | 4 | 23 | 28 | 0 | 0 | 100 | 43 | 38 |
| NN-43 | 43 | AW | 44 | 7 | 36 | 13 | 0 | 0 | 100 | 13 | 28 |
| NN-44 | 44 | AX | 47 | 0 | 20 | 33 | 0 | 0 | 100 | 39 | 19 |
| NN-45 | 45 | AF | 39 | 37 | 18 | 5 | 0 | 0 | 100 | 13 | 24 |
| NN-46 | 46 | AG | 4 | 2 | 71 | 23 | 0 | 0 | 100 | 42 | 31 |
| NN-47 | 47 | AH | 12 | 0 | 51 | 37 | 0 | 0 | 100 | 35 | 23 |
| NN-48 | 48 | AI | 12 | 22 | 55 | 7 | 0 | 4 | 100 | 11 | 34 |
| NN-49 | 49 | AJ | 59 | 5 | 3 | 23 | 10 | 0 | 100 | 11 | 37 |
| NN-50 | 50 | AK | 45 | 11 | 37 | 6 | 0 | 0 | 100 | 8 | 28 |
| NN-51 | 51 | AY | 34 | 12 | 35 | 14 | 0 | 5 | 100 | 43 | 72 |
| NN-52 | 1 | AZ | 49 | 11 | 30 | 10 | 0 | 0 | 100 | 21 | 61 |
| NN-53 | 1 | BA | 49 | 11 | 30 | 10 | 0 | 0 | 100 | 21 | 62 |
| NN-54 | 1 | BB | 49 | 11 | 30 | 10 | 0 | 0 | 100 | 21 | 62 |
| NN-55 | 1 | BC | 49 | 11 | 30 | 10 | 0 | 0 | 100 | 21 | 63 |
| NN-56 | 2 | BD | 41 | 0 | 40 | 19 | 0 | 0 | 100 | 50 | 16 |
| NN-57 | 2 | BE | 41 | 0 | 40 | 19 | 0 | 0 | 100 | 50 | 16 |
| NN-58 | 2 | BF | 41 | 0 | 40 | 19 | 0 | 0 | 100 | 50 | 16 |
| NN-59 | 2 | BG | 41 | 0 | 40 | 19 | 0 | 0 | 100 | 50 | 16 |

TABLE 5-1

| Test No. | TS (MPa) | $El_1$ (%) | λ (%) | El × λ | Workability | Elongation in tensile with notch of R30 $El_2$ (%) | $El_2/El_1$ | Example/ Comparative Example | Ac1 |
|---|---|---|---|---|---|---|---|---|---|
| NN-1 | 990 | 16.0 | 34.9 | 558.4 | GOOD | 6.1 | 0.382 | Example | 718 |
| NN-2 | 1178 | 13.0 | 26.5 | 344.2 | GOOD | 4.8 | 0.369 | Example | 720 |
| NN-3 | 1041 | 14.0 | 38.8 | 542.8 | GOOD | 4.3 | 0.307 | Example | 715 |
| NN-4 | 1214 | 11.0 | 28.0 | 308.0 | GOOD | 3.4 | 0.309 | Example | 719 |
| NN-5 | 1142 | 13.2 | 31.3 | 411.8 | GOOD | 4.3 | 0.326 | Example | 721 |
| NN-6 | 924 | 14.8 | 35.0 | 516.5 | GOOD | 5.2 | 0.352 | Example | 723 |
| NN-7 | 1102 | 12.9 | 33.4 | 431.9 | GOOD | 3.9 | 0.301 | Example | 779 |
| NN-8 | 1089 | 14.5 | 46.0 | 664.9 | GOOD | 5.4 | 0.374 | Example | 715 |
| NN-9 | 1256 | 11.0 | 50.8 | 558.5 | GOOD | 3.3 | 0.300 | Example | 718 |
| NN-10 | 1218 | 12.2 | 42.8 | 519.5 | GOOD | 3.8 | 0.313 | Example | 714 |
| NN-11 | 1124 | 13.8 | 48.0 | 662.7 | GOOD | 4.3 | 0.311 | Example | 772 |
| NN-12 | 1002 | 12.6 | 46.5 | 585.0 | GOOD | 4.0 | 0.318 | Example | 717 |
| NN-13 | 923 | 15.2 | 40.7 | 616.6 | GOOD | 5.1 | 0.336 | Example | 714 |
| NN-14 | 1158 | 13.5 | 33.7 | 454.8 | GOOD | 4.7 | 0.348 | Example | 727 |
| NN-15 | 1169 | 12.7 | 58.6 | 746.6 | GOOD | 4.0 | 0.314 | Example | 715 |
| NN-16 | 1252 | 12.0 | 29.0 | 346.6 | GOOD | 5.2 | 0.435 | Example | 728 |
| NN-17 | 1157 | 13.0 | 30.2 | 393.5 | GOOD | 5.3 | 0.407 | Example | 713 |
| NN-18 | 965 | 14.8 | 35.0 | 516.6 | GOOD | 5.1 | 0.346 | Example | 765 |
| NN-19 | 956 | 15.5 | 69.5 | 1077.3 | GOOD | 4.7 | 0.303 | Example | 716 |
| NN-20 | 1166 | 10.0 | 34.8 | 347.6 | GOOD | 3.8 | 0.380 | Example | 717 |
| NN-21 | 1045 | 14.4 | 61.6 | 885.5 | GOOD | 4.5 | 0.313 | Example | 709 |
| NN-22 | 1050 | 12.3 | 36.4 | 447.1 | GOOD | 3.9 | 0.318 | Example | 703 |
| NN-23 | 1253 | 12.5 | 25.3 | 316.6 | GOOD | 3.8 | 0.304 | Example | 705 |
| NN-24 | 1004 | 12.0 | 25.7 | 307.1 | GOOD | 4.3 | 0.360 | Example | 709 |
| NN-25 | 1084 | 15.2 | 39.0 | 592.2 | GOOD | 4.9 | 0.323 | Example | 713 |

TABLE 5-2

| Test No. | TS (MPa) | $El_1$ (%) | λ (%) | El × λ | Workability | Elongation in tensile with notch of R30 $El_2$ (%) | $El_2/El_1$ | Example/ Comparative Example | Ac1 |
|---|---|---|---|---|---|---|---|---|---|
| NN-26 | 1045 | 14.9 | 56.5 | 840.6 | GOOD | 4.5 | 0.303 | Example | 719 |
| NN-27 | 1085 | 12.3 | 50.3 | 617.7 | GOOD | 3.9 | 0.318 | Example | 707 |
| NN-28 | 980 | 13.5 | 52.9 | 712.6 | GOOD | 4.2 | 0.312 | Example | 718 |
| NN-29 | 1237 | 15.3 | 41.2 | 631.0 | GOOD | 4.8 | 0.314 | Example | 716 |
| NN-30 | 933 | 14.6 | 48.9 | 714.9 | GOOD | 4.7 | 0.321 | Example | 709 |
| NN-31 | 1044 | 11.9 | 67.5 | 799.6 | GOOD | 3.9 | 0.329 | Example | 710 |
| NN-32 | | | Evaluation was impossible | | | | | Comparative Example | 716 |
| NN-33 | 1311 | 8.0 | 22.0 | 176.0 | BAD | 1.8 | 0.225 | Comparative Example | 766 |
| NN-34 | 1175 | 10.0 | 61.2 | 611.7 | GOOD | 3.2 | 0.320 | Example | 761 |
| NN-35 | 1065 | 14.9 | 23.0 | 343.3 | BAD | 3.4 | 0.228 | Comparative Example | 724 |
| NN-36 | 1014 | 14.6 | 21.0 | 307.2 | BAD | 3.7 | 0.253 | Comparative Example | 741 |
| NN-37 | 1178 | 14.0 | 39.0 | 547.8 | GOOD | 4.5 | 0.321 | Example | 722 |
| NN-38 | 584 | 30.0 | 68.0 | 2040.0 | GOOD | 10.5 | 0.350 | Comparative Example | 719 |
| NN-39 | 1012 | 9.8 | 30.2 | 294.8 | BAD | 3.1 | 0.318 | Comparative Example | 710 |
| NN-40 | 814 | 12.0 | 50.9 | 610.3 | GOOD | 3.8 | 0.317 | Comparative Example | 710 |
| NN-41 | 1082 | 12.0 | 26.5 | 318.4 | GOOD | 4.1 | 0.342 | Example | 709 |
| NN-42 | 899 | 10.0 | 23.0 | 230.0 | BAD | 2.7 | 0.270 | Comparative Example | 748 |
| NN-43 | 1392 | 10.0 | 33.4 | 333.8 | GOOD | 3.4 | 0.340 | Example | 739 |
| NN-44 | 1144 | 16.1 | 21.0 | 337.8 | BAD | 4.5 | 0.280 | Comparative Example | 735 |
| NN-45 | 816 | 15.4 | 28.7 | 441.1 | GOOD | 4.8 | 0.312 | Comparative Example | 708 |
| NN-46 | 1623 | 6.0 | 30.0 | 180.0 | BAD | 1.5 | 0.250 | Comparative Example | 707 |
| NN-47 | 1182 | 11.6 | 24.0 | 279.6 | BAD | 3.2 | 0.275 | Comparative Example | 708 |
| NN-48 | 1216 | 7.0 | 43.7 | 305.7 | BAD | 2.2 | 0.314 | Comparative Example | 774 |
| NN-49 | 782 | 13.0 | 38.0 | 494.0 | GOOD | 4.1 | 0.315 | Comparative Example | 721 |
| NN-50 | 971 | 13.0 | 22.0 | 286.0 | BAD | 3.4 | 0.262 | Comparative Example | 723 |
| NN-51 | 1191 | 11.0 | 27.0 | 297.0 | BAD | 3.0 | 0.273 | Comparative Example | 770 |
| NN-52 | 974 | 10.0 | 34.9 | 349.3 | GOOD | 2.5 | 0.250 | Comparative Example | 718 |
| NN-53 | 974 | 16.0 | 34.9 | 558.4 | GOOD | 2.0 | 0.125 | Comparative Example | 718 |
| NN-54 | 974 | 16.0 | 34.9 | 558.4 | GOOD | 2.0 | 0.125 | Comparative Example | 718 |
| NN-55 | 974 | 16.0 | 34.9 | 558.4 | GOOD | 1.5 | 0.094 | Comparative Example | 718 |
| NN-56 | 1100 | 13.0 | 26.5 | 344.2 | GOOD | 2.0 | 0.154 | Comparative Example | 720 |
| NN-57 | 1100 | 13.0 | 26.5 | 344.2 | GOOD | 2.5 | 0.192 | Comparative Example | 720 |
| NN-58 | 900 | 13.0 | 26.5 | 344.2 | GOOD | 2.5 | 0.192 | Comparative Example | 720 |
| NN-59 | 1200 | 13.0 | 26.5 | 344.2 | GOOD | 1.5 | 0.115 | Comparative Example | 720 |

Examples in which the chemical composition and the manufacturing conditions were appropriate were excellent in tensile strength, elongation, and hole expandability, and were determined to have both strength and formability at a high level.

On the other hand, in Comparative Example NN-32, in addition to an excessive rolling load, a hot-rolled sheet shape defect made it impossible to perform a test after hot rolling. This is considered to be because the finish rolling completion temperature was too low.

In Comparative Example NN-33, martensite was insufficient, and on the other hand, the proportion of martensite adjacent to ferrite and the maximum difference in hardness in a sheet thickness direction were excessive, and as a result, elongation, hole expandability, workability, and deformability at a stress concentration portion were insufficient. This is presumed to be because the cooling rate from finish rolling to coiling was slow, and thus nonuniformity of a microstructure was promoted.

In Comparative Example NN-35, the proportion of martensite adjacent to ferrite and the maximum difference in hardness in a sheet thickness direction were excessive, and as a result, hole expandability, workability, and deformability at a stress concentration portion were insufficient. This is presumed to be because the coiling temperature was high, and thus nonuniformity of a microstructure was promoted.

In Comparative Example NN-36, the proportion of martensite adjacent to ferrite was excessive, and as a result, hole expandability, workability, and deformability at a stress concentration portion were insufficient. This is presumed to be because the heating rate before switching was low.

In Comparative Example NN-38, the amount of ferrite was excessive, the other microstructures were insufficient, and as a result, tensile strength was insufficient. This is presumed to be because the maximum heating temperature is low.

In Comparative Example NN-39, the amount of ferrite was small, while the amount of martensite was excessive, and as a result, elongation and workability were impaired. This is presumed to be because the maximum heating temperature is high.

In Comparative Example NN-40, the amount of ferrite was excessive, the amount of martensite was insufficient, and as a result, tensile strength was insufficient. This is presumed to be because the average cooling rate in a slow cooling zone is slow.

In Comparative Example NN-42, granular bainite and martensite were insufficient, and further the proportion of martensite adjacent to ferrite was excessive. As a result, tensile strength, hole expandability, workability, and deformability at a stress concentration portion were impaired. This is presumed to be because the staying time at 480 to 580° C. was too long.

In Comparative Example NN-44, granular bainite was not generated, martensite and bainite were excessive, and further the proportion of martensite adjacent to ferrite was excessive. As a result, hole expandability, workability, and deformability at a stress concentration portion were impaired. This is presumed to be because the staying time at 480° C. or more and 580° C. or less was short.

In Comparative Example NN-45, since C was insufficient, martensite was insufficient, and tensile strength was impaired.

In Comparative Example NN-46, since C was excessive, the amount of martensite was excessive, ferrite and granular bainite were insufficient, martensite was excessive, and elongation, workability, and deformability at a stress concentration portion were insufficient.

In Comparative Example NN-47, since Si+Al was insufficient, the amount of bainite was excessive while granular bainite was insufficient, and hole expandability, workability, and deformability at a stress concentration portion were insufficient.

In Comparative Example NN-48, since Si+Al was excessive, the steel sheet was embrittled, and elongation and workability were insufficient.

In Comparative Example NN-49, since Mn+Cr was insufficient, the amount of ferrite was excessive, the amount of martensite was insufficient, and tensile strength was insufficient.

In Comparative Example NN-50, since Mn+Cr was excessive, coarse Mn oxide or sulfide was formed, and hole expandability, workability, and deformability at a stress concentration portion were deteriorated.

In Comparative Example NN-51, the proportion of martensite adjacent to ferrite and the maximum difference in hardness in a sheet thickness direction were excessive, and as a result, workability and deformability at a stress concentration portion were insufficient. This is presumed to be because the finish rolling completion temperature was inappropriate.

In Comparative Example NN-52, the maximum difference in hardness in a sheet thickness direction was excessive, and as a result, deformability at a stress concentration portion was insufficient. This is presumed to be because the heating rate was switched in a too low temperature range.

In Comparative Example NN-53, the maximum difference in hardness in a sheet thickness direction was excessive, and as a result, deformability at a stress concentration portion was insufficient. This is presumed to be because the heating rate was switched in a too high temperature range.

In Comparative Example NN-54, the maximum difference in hardness in a sheet thickness direction was excessive, and as a result, deformability at a stress concentration portion was insufficient. This is presumed to be because the heating rate in the temperature range of Ac1 to Ac1+20° C. was too high.

In Comparative Example NN-55, the maximum difference in hardness in a sheet thickness direction was excessive, and as a result, deformability at a stress concentration portion was insufficient. This is presumed to be because the heating rate in the temperature range of Ac1 to Ac1+20° C. was too low.

In Comparative Example NN-56, granular bainite was not generated, further the proportion of martensite adjacent to ferrite was excessive, and as a result, deformability at a stress concentration portion was insufficient. This is presumed to be because the staying time at 480 to 580° C. was insufficient.

In Comparative Example NN-57, granular bainite was not generated, further the proportion of martensite adjacent to ferrite was excessive, and as a result, deformability at a stress concentration portion was insufficient. This is presumed to be because the staying time at 500 to 630° C. was insufficient.

In Comparative Example NN-58, granular bainite was not generated, further the proportion of martensite adjacent to ferrite was excessive, and as a result, deformability at a stress concentration portion was insufficient. This is presumed to be because the staying time at 500 to 630° C. was excessive.

In Comparative Example NN-59, granular bainite was not generated, further the proportion of martensite adjacent to ferrite was excessive, and as a result, deformability at a stress concentration portion was insufficient. This is presumed to be because the staying time within a temperature range of 480 to 580° C. and a temperature range of 500 to 630° C. was not provided.

(Experiment 2)

Various slabs having chemical compositions described in Table 6-1 and Table 6-2 were used as materials, and various steel sheets were manufactured according to various manufacturing conditions described in Table 7-1 to Table 8-2.

In Table 6-1 and Table 6-2, contents of elements not added to a slab are indicated by blank. In addition, a unit of a component of each slab was mass %, and the remainder was iron and impurities.

The temperature holding time at a maximum heating temperature was set within a range of 10 seconds or more and 500 seconds or less under all manufacturing conditions. In addition, a rolling reduction at the time of cold rolling was within a range of 10 to 80% under all manufacturing conditions. The tempering temperature and the tempering time under manufacturing conditions in which tempering is not performed are indicated by blank. In the case of having plating, either a hot-dip galvanized layer or a hot-dip zinc alloy-plated layer is applicable.

With regard to a steel sheet, values outside the scope of the invention and values that failed to meet acceptance criteria were underlined. With regard to manufacturing conditions, values outside a range considered to be appropriate were underlined.

Manufacturing conditions described as "no slow cooling zone" in Table 7-1 and Table 7-2 are those in which two-stage cooling was not performed after temperature holding at a maximum heating temperature. The "average cooling rate until 500° C." under such manufacturing conditions means the average cooling rate from a maximum heating temperature to a stay temperature range (temperature at which the temperature stays). On the other hand, manufacturing conditions that are not described as "no slow cooling zone" in Table 7-1 and Table 7-2 are those in which two-stage cooling was performed after temperature holding at a maximum heating temperature. Under such manufacturing conditions, the "average cooling rate in a slow cooling zone" means the average cooling rate from the maximum heating temperature to the cooling stop temperature in a slow cooling zone, and the "average cooling rate until 500° C." means the average cooling rate from the cooling stop temperature in a slow cooling zone to the stay temperature range.

The metallographic structure in a thickness ¼ portion of these steel sheets, the proportion of the number of martensites adjacent to ferrite to the number of metallographic structures adjacent to ferrite in the thickness ¼ portion (described as "proportion of martensite adjacent to ferrite" in the tables), and the difference between the absolute maximum value and the absolute minimum value of Vickers hardness at a load of 50 gf obtained at an interval of 30 μm from a position of a depth of 100 μm in a sheet thickness direction from a surface of a steel sheet as a starting point to a thickness middle portion position (described as "maximum difference in hardness in sheet thickness direction" in the tables) were evaluated and described in Table 9-1 and Table 9-2. These evaluations were performed according to the above-described method.

Further, tensile strength (TS), elongation (El), hole expandability (2), a, and workability of these steel sheets were evaluated and described in Table 10-1 and Table 10-2. These evaluation methods are as follows.

The tensile strength of a steel sheet was evaluated by taking a JIS5B test piece from the steel sheet so that a longitudinal direction was perpendicular to a rolling direction of the steel sheet, and performing a tensile test in accordance with JIS Z 2241:2011. A steel sheet having a tensile strength of 900 MPa or more was determined to be acceptable with respect to tensile strength.

Elongation of a steel sheet was evaluated for both normal elongation ($El_1$) measured by a normal test piece and processed part elongation ($El_2$) measured by a test piece in which a stress concentration portion was formed. Similar to the evaluation of tensile strength, normal elongation $El_1$ (total elongation El) of a steel sheet was evaluated by taking a JIS5B test piece from the steel sheet so that a longitudinal direction was perpendicular to a rolling direction of the steel sheet, and performing a tensile test in accordance with JIS Z 2241:2011. A steel sheet having a normal elongation $El_1$ of 10.0% or more was determined to be acceptable with respect to elongation. Processed part elongation $El_2$ was evaluated in the following manner: a circular notch having a radius R30 was provided in a longitudinal center portion of a JIS5B test piece taken from a steel sheet as shown in FIG. 3, and a tensile test was performed on this in the same manner as in the evaluation of normal elongation to measure total elongation. A steel sheet in which a value ($El_2/El_1$) obtained by dividing processed part elongation $El_2$ by normal elongation $El_1$ was more than 0.280 was determined to be acceptable with respect to deformability at a stress concentration portion.

Hole expandability (λ) of a steel sheet was evaluated by performing a hole expansion test in accordance with JIS Z 2256:2010. A steel sheet having a hole expandability of 25.0% or more was determined to be acceptable with respect to hole expandability.

In the method of evaluating workability of a steel sheet, a steel sheet satisfying lower limits of the elongation and hole expandability described above and having an elongation×hole expandability (El×λ) of 300.0 or more was determined to be acceptable with respect to workability.

The limit bending angle α is defined as a bending angle at a maximum load obtained by a bending test in accordance with VDA-238-100. A bending threshold satisfies the following formula obtained using a thickness t of a steel sheet. This threshold is necessary to avoid cracks associated with bending deformation at the time of collision. A steel sheet having a bending threshold of 0 or more was determined to be acceptable with respect to bendability.

$$\text{(Bending threshold)} = \alpha - \left(7.96 \times t^2 - 38.4 \times t + 120\right) \geq 0$$

TABLE 6-1

| No. | C | Si + Al | Mn + Cr | P | S | N | B | Ti | Nb | V | O |
|---|---|---|---|---|---|---|---|---|---|---|---|
| 1 | 0.08 | 0.9 | 2.7 | 0.003 | 0.0017 | 0.001 | | | | | 0.001 |
| 2 | 0.13 | 0.4 | 1.5 | 0.002 | 0.0019 | 0.001 | 0.002 | | | | 0.002 |
| 3 | 0.10 | 0.5 | 2.1 | 0.004 | 0.0006 | 0.001 | | | | | 0.001 |
| 4 | 0.13 | 0.5 | 1.7 | 0.002 | 0.0009 | 0.001 | 0.001 | | 0.03 | | 0.001 |
| 5 | 0.12 | 0.6 | 1.4 | 0.004 | 0.0014 | 0.001 | 0.002 | 0.02 | | | 0.001 |
| 6 | 0.08 | 0.5 | 3.1 | 0.002 | 0.0011 | 0.002 | | | | | 0.001 |
| 7 | 0.11 | 0.3 | 3.5 | 0.004 | 0.0008 | 0.001 | | | | | 0.001 |
| 8 | 0.11 | 0.4 | 2.3 | 0.002 | 0.0010 | 0.001 | 0.001 | | | | 0.001 |
| 9 | 0.14 | 0.7 | 1.8 | 0.003 | 0.0012 | 0.002 | | | | | 0.001 |
| 10 | 0.13 | 0.6 | 2.5 | 0.003 | 0.0008 | 0.001 | 0.002 | 0.02 | 0.03 | | 0.001 |
| 11 | 0.11 | 0.6 | 2.8 | 0.004 | 0.0019 | 0.002 | | | | | 0.001 |
| 12 | 0.09 | 0.5 | 2.8 | 0.002 | 0.0009 | 0.001 | | | | | 0.001 |
| 13 | 0.08 | 0.4 | 1.8 | 0.004 | 0.0009 | 0.001 | | | | | 0.002 |
| 14 | 0.12 | 0.7 | 3.4 | 0.002 | 0.0012 | 0.001 | | 0.03 | | | 0.001 |
| 15 | 0.12 | 0.6 | 2.8 | 0.003 | 0.0004 | 0.001 | | | 0.02 | | 0.001 |
| 16 | 0.14 | 0.6 | 2.3 | 0.002 | 0.0005 | 0.001 | | | | | 0.003 |
| 17 | 0.12 | 0.5 | 2.5 | 0.003 | 0.0017 | 0.001 | | | | | 0.001 |
| 18 | 0.08 | 0.7 | 1.8 | 0.004 | 0.0004 | 0.002 | | | | | 0.001 |
| 19 | 0.08 | 0.5 | 1.7 | 0.002 | 0.0013 | 0.001 | | | | | 0.001 |
| 20 | 0.12 | 0.7 | 3.2 | 0.003 | 0.0013 | 0.001 | | 0.03 | | | 0.001 |
| 21 | 0.10 | 0.3 | 2.1 | 0.004 | 0.0016 | 0.001 | | | | | 0.002 |
| 22 | 0.10 | 0.4 | 2.8 | 0.003 | 0.0018 | 0.002 | | | | | 0.001 |
| 23 | 0.14 | 0.5 | 2.6 | 0.002 | 0.0008 | 0.001 | | | | | 0.001 |
| 24 | 0.09 | 0.5 | 2.2 | 0.002 | 0.0015 | 0.003 | | | | | 0.001 |
| 25 | 0.11 | 0.4 | 1.7 | 0.002 | 0.0013 | 0.001 | | | | 0.20 | 0.001 |
| 26 | 0.10 | 0.4 | 2.0 | 0.002 | 0.0014 | 0.002 | | | | | 0.001 |
| 27 | 0.11 | 0.4 | 2.3 | 0.002 | 0.0005 | 0.001 | | | | | 0.001 |
| 28 | 0.09 | 0.5 | 1.5 | 0.003 | 0.0007 | 0.002 | | | | | 0.001 |
| 29 | 0.14 | 0.4 | 1.6 | 0.003 | 0.0015 | 0.001 | 0.002 | | | | 0.002 |
| 30 | 0.08 | 0.3 | 2.0 | 0.003 | 0.0012 | 0.002 | | | | | 0.001 |
| 31 | 0.10 | 0.4 | 2.8 | 0.002 | 0.0007 | 0.002 | | | | | 0.002 |
| 32 | 0.08 | 0.7 | 2.6 | 0.012 | 0.0079 | 0.002 | | | | | 0.002 |
| 33 | 0.09 | 2.1 | 3.4 | 0.012 | 0.0043 | 0.004 | | | | | 0.002 |
| 34 | 0.10 | 1.7 | 1.9 | 0.002 | 0.0065 | 0.005 | | | | | 0.002 |
| 35 | 0.08 | 2.4 | 1.5 | 0.005 | 0.0013 | 0.008 | | | | | 0.002 |
| 36 | 0.09 | 1.0 | 2.6 | 0.003 | 0.0076 | 0.003 | | 0.02 | 0.03 | | 0.002 |
| 37 | 0.08 | 1.3 | 1.8 | 0.007 | 0.0067 | 0.006 | | | | | 0.002 |
| 38 | 0.12 | 0.9 | 2.3 | 0.003 | 0.0023 | 0.009 | | | | | 0.002 |
| 39 | 0.09 | 0.6 | 1.9 | 0.006 | 0.0059 | 0.006 | | | | | 0.002 |

TABLE 6-1-continued

| No. | C | Si + Al | Mn + Cr | P | S | N | B | Ti | Nb | V | O |
|---|---|---|---|---|---|---|---|---|---|---|---|
| 40 | 0.09 | 0.5 | 2.2 | 0.010 | 0.0088 | 0.003 | | | | | 0.002 |
| 41 | 0.13 | 2.4 | 2.6 | 0.005 | 0.0082 | 0.003 | | | | | 0.002 |
| 42 | 0.11 | 0.5 | 2.0 | 0.012 | 0.0042 | 0.007 | | | | | 0.002 |
| 43 | 0.10 | 0.8 | 3.8 | 0.016 | 0.0023 | 0.008 | 0.002 | | | | 0.002 |
| 44 | 0.13 | 1.9 | 2.5 | 0.017 | 0.0061 | 0.003 | | | | | 0.002 |
| 45 | 0.15 | 1.5 | 2.9 | 0.018 | 0.0035 | 0.001 | | | | | 0.002 |
| 46 | 0.11 | 1.2 | 2.0 | 0.014 | 0.0025 | 0.004 | | | | | 0.002 |
| 47 | 0.12 | 1.5 | 2.2 | 0.018 | 0.0067 | 0.008 | | | | 0.10 | 0.002 |
| 48 | 0.05 | 0.5 | 2.7 | 0.004 | 0.0003 | 0.002 | | | | | 0.002 |
| 49 | 0.22 | 0.4 | 2.3 | 0.002 | 0.0004 | 0.001 | | | | | 0.001 |
| 50 | 0.14 | 0.1 | 1.7 | 0.002 | 0.0008 | 0.001 | | | | | 0.001 |
| 51 | 0.11 | 2.7 | 2.3 | 0.002 | 0.0017 | 0.001 | | | | | 0.001 |
| 52 | 0.10 | 0.4 | 1.1 | 0.004 | 0.0016 | 0.001 | | | | | 0.003 |
| 53 | 0.08 | 0.6 | 4.3 | 0.002 | 0.0013 | 0.002 | | | | | 0.001 |

TABLE 6-2

| No. | Mo | Co | Ni | Cu | W | Ta | Sn | Sb | As | Mg | Ca | Y | Zr | La | Ce |
|---|---|---|---|---|---|---|---|---|---|---|---|---|---|---|---|
| 1 | | | | | | | | | | | | | | | |
| 2 | 0.05 | | | | | | | | | | | | | | |
| 3 | | | | | | | | | | | | | | | |
| 4 | | | | | | | | | | | | | | | |
| 5 | 0.04 | | | | | | | | | | | | | | |
| 6 | | | | | | | | | | | | | | | |
| 7 | | | | | | | | | | | | | | | |
| 8 | | | | | | | | | | | | | | | |
| 9 | | | 0.20 | | | | | | | | | | | | |
| 10 | 0.05 | | | | | | | | | | | | | | |
| 11 | | | | | | | | | | | | | | | |
| 12 | | | | | | | | | 0.01 | | | | | | |
| 13 | | | | | | | | | | | | | | | |
| 14 | | | | | | | | | | | | | | | |
| 15 | | | | | | | 0.02 | | | | 0.001 | | | | |
| 16 | | | | | | | | | | | | | | | |
| 17 | | | | | | | | 0.02 | | | | | | | |
| 18 | | | | | | 0.05 | | | | | | | | | |
| 19 | | | | | | | | | | 0.02 | | | | | 0.02 |
| 20 | | | | | 0.02 | | | | | | | | | | |
| 21 | | | | | | | | | | | | | | | |
| 22 | | | | 0.50 | | | | | | | | | | | |
| 23 | | | | | | | | | | | | | | | |
| 24 | | | | | | | | | | | | | | | |
| 25 | | | | | | | | | | | | | | | |
| 26 | | | | | | | | | | | | | | | |
| 27 | | 0.10 | | | | | | | | | | | | | |
| 28 | 0.05 | | | | | | | | | | | | 0.01 | | |
| 29 | | | | | | | | | | | | | | | |
| 30 | | | | | | | | | | | | | | 0.01 | |
| 31 | | | | | | | | | | | | | | | |
| 32 | | | | | | | | | | | | | | | |
| 33 | | | | | | | | | | | | | | | |
| 34 | | | | | | | | | | | | | | | |
| 35 | | | | | | | | | | | | | | | |
| 36 | | | | | | | | | | | | | | | |
| 37 | | | | | | | | | | | | | | | |
| 38 | | | | | | | | | | | | | | | |
| 39 | | | | | | | | | | | | 0.03 | | | |
| 40 | | | | | | | | | | | | | | | |
| 41 | | | | | | | | | | | | | | | |
| 42 | | | | | | | | | | | | | | | |
| 43 | | | | | | | | | | | | | | | |
| 44 | | | | | | | | | | | | | | | |
| 45 | | | | | | | | | | | | | | | |
| 46 | | | | | | | | | | | | | | | |
| 47 | | | | | | | | | | | | | | | |
| 48 | | | | | | | | | | | | | | | |
| 49 | | | | | | | | | | | | | | | |
| 50 | | | | | | | | | | | | | | | |
| 51 | | | | | | | | | | | | | | | |
| 52 | | | | | | | | | | | | | | | |
| 53 | | | | | | | | | | | | | | | |

TABLE 7-1

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Dew point in heating furnace/ ° C. | Maximum heating temperature | Cooling stop temperature in slow cooling zone | Average cooling rate in slow cooling zone | Cooling rate at 580° C. or more |
|---|---|---|---|---|---|---|---|---|---|---|---|
| A | 919 | 32 | 180 | 2.8 | 650 | 0.7 | 0 | 800 | No slow cooling zone | | 32 |
| B | 935 | 76 | 164 | 3.7 | 670 | 0.7 | 0 | 790 | No slow cooling zone | | 34 |
| C | 899 | 65 | 351 | 3.5 | 670 | 0.7 | 0 | 790 | No slow cooling zone | | 24 |
| D | 944 | 35 | 202 | 5.0 | 670 | 0.7 | 0 | 790 | No slow cooling zone | | 27 |
| E | 924 | 30 | 473 | 3.5 | 670 | 0.7 | 0 | 820 | No slow cooling zone | | 27 |
| F | 924 | 53 | 264 | 4.9 | 670 | 0.7 | 0 | 810 | No slow cooling zone | | 28 |
| G | 932 | 30 | 497 | 0.7 | 670 | 0.7 | 5 | 830 | No slow cooling zone | | 24 |
| H | 926 | 39 | 344 | 8.3 | 670 | 1.0 | 0 | 800 | No slow cooling zone | | 32 |
| I | 909 | 58 | 549 | 5.3 | 670 | 1.0 | 0 | 790 | No slow cooling zone | | 24 |
| J | 902 | 45 | 530 | 4.3 | 670 | 1.0 | −5 | 820 | No slow cooling zone | | 22 |
| K | 889 | 94 | 594 | 3.0 | 670 | 1.0 | 0 | 830 | No slow cooling zone | | 25 |
| L | 938 | 69 | 430 | 6.6 | 680 | 1.0 | 0 | 748 | 636 | 2.1 | 33.0 |
| M | 921 | 89 | 239 | 5.8 | 680 | 1.0 | 10 | 800 | No slow cooling zone | | 32 |
| N | 910 | 56 | 415 | 5.9 | 680 | 1.0 | 0 | 820 | No slow cooling zone | | 23 |
| O | 887 | 76 | 596 | 5.1 | 680 | 1.0 | 0 | 820 | No slow cooling zone | | 30 |
| P | 920 | 41 | 305 | 6.5 | 680 | 1.0 | 0 | 832 | No slow cooling zone | | 31 |
| Q | 900 | 43 | 272 | 1.6 | 680 | 1.6 | 0 | 812 | No slow cooling zone | | 32 |
| R | 912 | 51 | 339 | 9.1 | 680 | 1.6 | 0 | 830 | No slow cooling zone | | 29 |
| S | 929 | 74 | 585 | 7.0 | 680 | 1.6 | 0 | 792 | No slow cooling zone | | 22 |
| T | 898 | 27 | 543 | 2.1 | 680 | 1.6 | 0 | 797 | No slow cooling zone | | 26 |
| U | 912 | 84 | 450 | 5.7 | 680 | 1.6 | −1 | 799 | No slow cooling zone | | 28 |
| V | 901 | 73 | 310 | 8.4 | 680 | 1.6 | 0 | 850 | 680 | 1.5 | 30.0 |
| W | 906 | 44 | 436 | 8.2 | 680 | 1.6 | 3 | 812 | No slow cooling zone | | 31 |
| X | 928 | 64 | 123 | 5.3 | 680 | 1.6 | −3 | 835 | No slow cooling zone | | 28 |
| Y | 895 | 62 | 263 | 5.2 | 700 | 1.6 | −2 | 800 | No slow cooling zone | | 23 |
| Z | 924 | 51 | 606 | 2.1 | 700 | 1.6 | −1 | 799 | No slow cooling zone | | 29 |
| AA | 912 | 45 | 611 | 6.1 | 700 | 1.6 | −9 | 820 | No slow cooling zone | | 31 |
| AB | 938 | 64 | 529 | 8.9 | 700 | 2.0 | −13 | 820 | No slow cooling zone | | 29 |
| AC | 895 | 68 | 408 | 9.2 | 700 | 2.0 | 2 | 780 | No slow cooling zone | | 34 |
| AD | 934 | 85 | 332 | 5.2 | 700 | 2.0 | −4 | 800 | No slow cooling zone | | 32 |
| AE | 897 | 91 | 435 | 9.3 | 700 | 2.0 | 2 | 835 | No slow cooling zone | | 25 |
| AL | 830 | | | In addition to excessive rolling load, hot-rolled sheet shape defect made it impossible to perform test after hot rolling | | | | | | | |

TABLE 7-2

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Dew point in heating furnace/ ° C. | Maximum heating temperature | Cooling stop temperature in slow cooling zone | Average cooling rate in slow cooling zone | Cooling rate at 580° C. or more |
|---|---|---|---|---|---|---|---|---|---|---|---|
| AM | 893 | 17 | 571 | 5.1 | 670 | 1.6 | 0 | 850 | No slow cooling zone | | 29 |
| AN | 916 | 102 | 414 | 6.2 | 670 | 1.6 | 0 | 840 | No slow cooling zone | | 24 |
| AO | 894 | 97 | 83 | 7.0 | 670 | 1.6 | 0 | 860 | No slow cooling zone | | 29 |
| AP | 941 | 45 | 702 | 6.6 | 670 | 1.6 | 3 | 820 | No slow cooling zone | | 26 |
| AQ | 908 | 71 | 307 | 0.1 | 670 | 1.6 | 3 | 840 | No slow cooling zone | | 30 |
| AR | 927 | 93 | 195 | 51.4 | 670 | 1.6 | 2 | 820 | No slow cooling zone | | 28 |
| AS | 896 | 50 | 284 | 9.0 | 670 | 1.6 | −30 | 860 | No slow cooling zone | | 33 |
| AT | 896 | 50 | 284 | 9.0 | 670 | 1.6 | 25 | 860 | No slow cooling zone | | 33 |
| AU | 896 | 50 | 284 | 9.0 | 670 | 1.6 | 0 | 700 | No slow cooling zone | | 33 |
| AV | 903 | 67 | 145 | 8.8 | 670 | 1.6 | 0 | 930 | No slow cooling zone | | 23 |
| AW | 931 | 28 | 236 | 2.2 | 670 | 1.6 | 0 | 860 | 616 | 1.6 | 25 |
| AX | 917 | 88 | 324 | 1.7 | 670 | 1.6 | 0 | 787 | 637 | 0.5 | 23 |
| AY | 927 | 29 | 531 | 4.5 | 670 | 1.6 | 0 | 787 | 630 | 20.7 | 26 |
| AZ | 918 | 50 | 273 | 4.9 | 670 | 1.6 | −10 | 830 | No slow cooling zone | | 4 |
| BA | 929 | 52 | 455 | 6.6 | 670 | 1.6 | 0 | 820 | No slow cooling zone | | 102 |
| BB | 887 | 40 | 320 | 6.2 | 670 | 1.6 | 0 | 815 | No slow cooling zone | | 28 |
| BC | 938 | 53 | 154 | 3.8 | 670 | 1.6 | 0 | 830 | No slow cooling zone | | 32 |
| AF | 890 | 32 | 561 | 5.0 | 670 | 1.6 | 0 | 810 | No slow cooling zone | | 41 |
| AG | 927 | 56 | 476 | 5.0 | 670 | 1.6 | 0 | 810 | No slow cooling zone | | 71.0 |
| AH | 898 | 36 | 401 | 5.0 | 670 | 1.6 | −10 | 816 | 650 | 2.9 | 84 |
| AI | 908 | 39 | 186 | 5.0 | 670 | 1.6 | 0 | 870 | No slow cooling zone | | 98 |
| AJ | 898 | 94 | 502 | 5.0 | 670 | 1.6 | 0 | 803 | No slow cooling zone | | 65 |
| AK | 929 | 40 | 289 | 5.0 | 670 | 1.6 | 0 | 800 | No slow cooling zone | | 35 |
| BD | 919 | 32 | 180 | 1 | 600 | 0.7 | 0 | 800 | No slow cooling zone | 32 | 32 |
| BE | 919 | 32 | 180 | 5 | 730 | 0.7 | 0 | 800 | No slow cooling zone | 32 | 32 |
| BF | 919 | 32 | 180 | 5 | 650 | 5.0 | 0 | 800 | No slow cooling zone | 32 | 32 |
| BG | 919 | 32 | 180 | 10 | 650 | 0.5 | 0 | 800 | No slow cooling zone | 32 | 4 |

TABLE 7-2-continued

| No. | Finish rolling completion temperature | Cooling rate from finish rolling to coiling | Coiling temperature | Heating rate before switching | Switching heating rate at 650° C. to Ac1 temperature | Heating rate at Ac1 to Ac1 + 20° C. | Dew point in heating furnace/ ° C. | Maximum heating temperature | Cooling stop temperature in slow cooling zone | Average cooling rate in slow cooling zone | Cooling rate at 580° C. or more |
|---|---|---|---|---|---|---|---|---|---|---|---|
| BH | 935 | 76 | 164 | 1 | 670 | 0.7 | 0 | 790 | No slow cooling zone | 34 | 34 |
| BI | 935 | 76 | 164 | 1 | 670 | 0.7 | 0 | 790 | No slow cooling zone | 34 | 34 |
| BJ | 935 | 76 | 164 | 1 | 670 | 0.7 | 0 | 790 | No slow cooling zone | 34 | 34 |
| BK | 935 | 76 | 164 | 1 | 670 | 0.7 | 0 | 790 | No slow cooling zone | 34 | 34 |

TABLE 8-1

| No. | Staying time at 480 to 580° C. | Staying time at 500 to 630° C. | Whether plating was performed or not | Whether alloying was performed or not | Whether tempering was performed or not | Tempering temperature | Tempering time | Ac1 |
|---|---|---|---|---|---|---|---|---|
| A | 65 | 20 | Performed | Performed | Performed | 265 | 70 | 718 |
| B | 48 | 20 | Performed | Performed | Performed | 262 | 70 | 720 |
| C | 55 | 20 | Performed | Performed | Not performed | | | 715 |
| D | 68 | 20 | Performed | Performed | Performed | 261 | 72 | 719 |
| E | 35 | 20 | Performed | Performed | Performed | 262 | 27 | 721 |
| F | 26 | 20 | Performed | Performed | Performed | 257 | 87 | 723 |
| G | 35 | 20 | Performed | Performed | Not performed | | | 779 |
| H | 48 | 20 | Performed | Performed | Performed | 262 | 76 | 715 |
| I | 39 | 20 | Performed | Performed | Performed | 267 | 70 | 718 |
| J | 82 | 20 | Performed | Performed | Performed | 300 | 30 | 714 |
| K | 67 | 20 | Performed | Performed | Not performed | | | 772 |
| L | 28.0 | 20 | Performed | Performed | Performed | 252 | 22 | 717 |
| M | 48 | 20 | Performed | Performed | Performed | 253 | 93 | 714 |
| N | 37 | 20 | Performed | Performed | Performed | 268 | 55 | 727 |
| O | 39 | 20 | Performed | Performed | Not performed | | | 715 |
| P | 22 | 20 | Performed | Performed | Performed | 259 | 41 | 728 |
| Q | 45 | 20 | Not performed | Not performed | Performed | 257 | 61 | 713 |
| R | 54 | 20 | Performed | Performed | Performed | 267 | 46 | 765 |
| S | 62 | 20 | Performed | Performed | Performed | 262 | 66 | 716 |
| T | 57 | 20 | Performed | Performed | Not performed | | | 717 |
| U | 41 | 20 | Performed | Performed | Performed | 254 | 86 | 709 |
| V | 68.0 | 20 | Performed | Performed | Performed | 259 | 26 | 703 |
| W | 29 | 40 | Performed | Performed | Performed | 256 | 47 | 705 |
| X | 68 | 40 | Performed | Performed | Not performed | | | 709 |
| Y | 59 | 40 | Performed | Performed | Performed | 259 | 48 | 713 |
| Z | 35 | 40 | Performed | Performed | Not performed | | | 719 |
| AA | 46 | 40 | Not performed | Not performed | Performed | 261 | 89 | 707 |
| AB | 37 | 40 | Performed | Performed | Performed | 263 | 49 | 718 |
| AC | 68 | 40 | Performed | Performed | Performed | 264 | 90 | 716 |
| AD | 55 | 40 | Performed | Performed | Performed | 262 | 67 | 709 |
| AE | 43 | 300 | Performed | Performed | Performed | 259 | 73 | 710 |
| AL | In addition to excessive rolling load, hot-rolled sheet shape defect made it impossible to perform test after hot rolling | | | | | | | 716 |

TABLE 8-2

| No. | Staying time at 480 to 580° C. | Staying time at 500 to 630° C. | Whether plating was performed or not | Whether alloying was performed or not | Whether tempering was performed or not | Tempering temperature | Tempering time | Ac1 |
|---|---|---|---|---|---|---|---|---|
| AM | 49 | 40 | Performed | Performed | Performed | 255 | 64 | 762 |
| AN | 23 | 40 | Performed | Not performed | Not performed | | | 766 |
| AO | 73 | 40 | Performed | Performed | Performed | 259 | 93 | 761 |
| AP | 63 | 40 | Performed | Not performed | Not performed | | | 771 |
| AQ | 72 | 40 | Not performed | Not performed | Not performed | | | 724 |
| AR | 65 | 40 | Performed | Performed | Performed | 252 | 50 | 741 |
| AS | 23 | 40 | Performed | Performed | Performed | 252 | 21 | 722 |
| AT | 23 | 40 | Performed | Performed | Performed | 252 | 21 | 719 |
| AU | 23 | 40 | Performed | Performed | Performed | 252 | 21 | 710 |
| AV | 38 | 40 | Performed | Not performed | Not performed | | | 761 |
| AW | 39 | 40 | Performed | Not performed | Not performed | | | 710 |
| AX | 71 | 40 | Performed | Not performed | Not performed | | | 709 |
| AY | 47 | 40 | Performed | Performed | Performed | 262 | 24 | 748 |

TABLE 8-2-continued

| No. | Staying time at 480 to 580° C. | Staying time at 500 to 630° C. | Whether plating was performed or not | Whether alloying was performed or not | Whether tempering was performed or not | Tempering temperature | Tempering time | Ac1 |
|---|---|---|---|---|---|---|---|---|
| AZ | 62 | 40 | Performed | Performed | Performed | 264 | 90 | 739 |
| BA | 74 | 40 | Performed | Not performed | Not performed | | | 735 |
| BB | 3 | 40 | Performed | Performed | Performed | 253 | 20 | 741 |
| BC | 400 | 40 | Performed | Performed | Performed | 258 | 62 | 770 |
| AF | 49 | 40 | Performed | Performed | Performed | 316 | 190 | 708 |
| AG | 49.0 | 40 | Performed | Performed | Performed | 265 | 147 | 707 |
| AH | 49 | 40 | Performed | Performed | Performed | 328 | 272 | 708 |
| AI | 43 | 40 | Performed | Performed | Performed | 321 | 160 | 774 |
| AJ | 65 | 40 | Performed | Performed | Performed | 332 | 56 | 721 |
| AK | 60 | 40 | Performed | Performed | Performed | 314 | 218 | 723 |
| BD | 20 | 40 | Performed | Performed | Performed | 265 | 70 | 718 |
| BE | 20 | 40 | Performed | Performed | Performed | 265 | 70 | 718 |
| BF | 20 | 40 | Performed | Performed | Performed | 265 | 70 | 718 |
| BG | 20 | 40 | Performed | Performed | Performed | 265 | 70 | 718 |
| BH | 7 | 40 | Performed | Performed | Performed | 262 | 70 | 720 |
| BI | 20 | 5 | Performed | Performed | Performed | 262 | 70 | 720 |
| BJ | 20 | 600 | Performed | Performed | Performed | 262 | 70 | 720 |
| BK | 0 | 0 | Performed | Performed | Performed | 262 | 70 | 720 |

TABLE 9-1

| Test No. | Steel No. | Manufacturing method No. | Ferrite | Granular bainite | Martensite | Upper bainite and lower bainite | Pearlite | Residual austenite | Total micro-structure | Proportion of martensite adjacent to ferrite | Maximum difference in hardness in sheet thickness direction | Hv30/Hvi |
|---|---|---|---|---|---|---|---|---|---|---|---|---|
| NA-1 | 1 | A | 49 | 11 | 30 | 10 | 0 | 0 | 100 | 21 | 23 | 0.7 |
| NA-2 | 2 | B | 41 | 9 | 31 | 19 | 0 | 0 | 100 | 20 | 16 | 0.6 |
| NA-3 | 3 | C | 42 | 8 | 31 | 19 | 0 | 0 | 100 | 25 | 22 | 0.6 |
| NA-4 | 4 | D | 41 | 17 | 30 | 12 | 0 | 0 | 100 | 12 | 14 | 0.6 |
| NA-5 | 5 | E | 25 | 7 | 45 | 23 | 0 | 0 | 100 | 28 | 11 | 0.6 |
| NA-6 | 6 | F | 37 | 6 | 33 | 24 | 0 | 0 | 100 | 17 | 9 | 0.5 |
| NA-7 | 7 | G | 25 | 12 | 52 | 11 | 0 | 0 | 100 | 29 | 15 | 0.6 |
| NA-8 | 8 | H | 36 | 9 | 39 | 16 | 0 | 0 | 100 | 15 | 8 | 0.6 |
| NA-9 | 9 | I | 42 | 5 | 32 | 21 | 0 | 0 | 100 | 17 | 32 | 0.6 |
| NA-10 | 10 | J | 18 | 12 | 55 | 15 | 0 | 0 | 100 | 27 | 25 | 0.7 |
| NA-11 | 11 | K | 32 | 11 | 48 | 9 | 0 | 0 | 100 | 30 | 33 | 0.6 |
| NA-12 | 12 | L | 22 | 9 | 54 | 15 | 0 | 0 | 100 | 17 | 32 | 0.6 |
| NA-13 | 13 | M | 41 | 6 | 31 | 22 | 0 | 0 | 100 | 14 | 26 | 0.7 |
| NA-14 | 14 | N | 28 | 6 | 44 | 22 | 0 | 0 | 100 | 16 | 21 | 0.7 |
| NA-15 | 15 | O | 23 | 12 | 52 | 12 | 0 | 0 | 100 | 18 | 35 | 0.6 |
| NA-16 | 16 | P | 16 | 9 | 55 | 20 | 0 | 0 | 100 | 22 | 8 | 0.6 |
| NA-17 | 17 | Q | 26 | 8 | 52 | 13 | 0 | 0 | 100 | 30 | 7 | 0.6 |
| NA-18 | 18 | R | 38 | 12 | 35 | 15 | 0 | 0 | 100 | 11 | 14 | 0.6 |
| NA-19 | 19 | S | 44 | 16 | 30 | 10 | 0 | 0 | 100 | 13 | 43 | 0.5 |
| NA-20 | 20 | T | 42 | 9 | 30 | 19 | 0 | 0 | 100 | 29 | 16 | 0.6 |
| NA-21 | 21 | U | 36 | 14 | 39 | 11 | 0 | 0 | 100 | 13 | 35 | 0.5 |
| NA-22 | 22 | V | 19 | 12 | 54 | 15 | 0 | 0 | 100 | 17 | 24 | 0.7 |
| NA-23 | 23 | W | 21 | 9 | 54 | 16 | 0 | 0 | 100 | 13 | 15 | 0.7 |
| NA-24 | 24 | X | 16 | 15 | 55 | 14 | 0 | 0 | 100 | 21 | 13 | 0.5 |
| NA-25 | 25 | Y | 41 | 10 | 31 | 18 | 0 | 0 | 100 | 13 | 16 | 0.5 |
| NA-26 | 26 | Z | 40 | 10 | 37 | 13 | 0 | 0 | 100 | 29 | 33 | 0.7 |
| NA-27 | 27 | AA | 19 | 6 | 54 | 20 | 0 | 0 | 100 | 25 | 32 | 0.5 |
| NA-28 | 28 | AB | 28 | 6 | 43 | 23 | 0 | 0 | 100 | 14 | 37 | 0.5 |
| NA-29 | 29 | AC | 42 | 10 | 30 | 18 | 0 | 0 | 100 | 11 | 28 | 0.5 |
| NA-30 | 30 | AD | 38 | 9 | 38 | 15 | 0 | 0 | 100 | 16 | 34 | 0.7 |
| NA-31 | 31 | AE | 15 | 12 | 55 | 18 | 0 | 0 | 100 | 17 | 33 | 0.6 |
| NA-32 | 32 | AL | | | | | Evaluation was impossible | | | | | |

TABLE 9-2

| Test No. | Steel No. | Manufacturing method No. | Ferrite | Granular bainite | Martensite | Upper bainite and lower bainite | Pearlite | Residual austenite | Total micro-structure | Proportion of martensite adjacent to ferrite | Maximum difference in hardness in sheet thickness direction | Hv30/Hvi |
|---|---|---|---|---|---|---|---|---|---|---|---|---|
| NA-33 | 33 | AM | 48 | 12 | 26 | 11 | 0 | 4 | 100 | 63 | 64 | 0.6 |
| NA-34 | 34 | AN | 42 | 5 | 30 | 20 | 0 | 3 | 100 | 13 | 31 | 0.6 |
| NA-35 | 35 | AO | 40 | 8 | 32 | 16 | 0 | 4 | 100 | 12 | 24 | 0.7 |
| NA-36 | 36 | AP | 40 | 13 | 36 | 10 | 0 | 0 | 100 | 54 | 65 | 0.4 |
| NA-37 | 37 | AQ | 38 | 9 | 38 | 16 | 0 | 0 | 100 | 83 | 26 | 0.6 |
| NA-38 | 38 | AR | 33 | 7 | 42 | 18 | 0 | 0 | 100 | 13 | 43 | 0.5 |
| NA-39 | 39 | AS | 33 | 10 | 32 | 25 | 0 | 0 | 100 | 21 | 28 | 0.9 |
| NA-40 | 39 | AT | 33 | 10 | 32 | 25 | 0 | 0 | 100 | 21 | 27 | 0.3 |
| NA-41 | 39 | AU | 100 | 0 | 0 | 0 | 0 | 0 | 100 | 0 | 9 | 0.6 |
| NA-42 | 40 | AV | 8 | 11 | 67 | 14 | 0 | 0 | 100 | 18 | 19 | 0.7 |
| NA-43 | 41 | AW | 47 | 10 | 32 | 11 | 0 | 0 | 100 | 20 | 18 | 0.7 |
| NA-44 | 42 | AX | 49 | 12 | 30 | 9 | 0 | 0 | 100 | 17 | 32 | 0.6 |
| NA-45 | 43 | AY | 35 | 13 | 42 | 10 | 0 | 0 | 100 | 18 | 18 | 0.7 |
| NA-46 | 44 | AZ | 52 | 6 | 28 | 14 | 0 | 0 | 100 | 29 | 38 | 0.6 |
| NA-47 | 45 | BA | 44 | 7 | 36 | 13 | 0 | 0 | 100 | 13 | 28 | 0.7 |
| NA-48 | 46 | BB | 47 | 0 | 20 | 33 | 0 | 0 | 100 | 39 | 13 | 0.5 |
| NA-49 | 47 | BC | 44 | 51 | 5 | 0 | 0 | 0 | 100 | 15 | 21 | 0.6 |
| NA-50 | 48 | AF | 39 | 37 | 18 | 5 | 0 | 0 | 100 | 13 | 24 | 0.6 |
| NA-51 | 49 | AG | 4 | 2 | 71 | 23 | 0 | 0 | 100 | 42 | 31 | 0.5 |
| NA-52 | 50 | AH | 12 | 0 | 51 | 37 | 0 | 0 | 100 | 35 | 23 | 0.6 |
| NA-53 | 51 | AI | 12 | 22 | 55 | 7 | 0 | 4 | 100 | 11 | 34 | 0.6 |
| NA-54 | 52 | AJ | 59 | 5 | 3 | 23 | 10 | 0 | 100 | 11 | 37 | 0.7 |
| NA-55 | 53 | AK | 45 | 11 | 37 | 6 | 0 | 0 | 100 | 8 | 28 | 0.5 |
| NA-56 | 1 | BD | 49 | 11 | 30 | 10 | 0 | 0 | 100 | 21 | 62 | 1.0 |
| NA-57 | 1 | BE | 49 | 11 | 30 | 10 | 0 | 0 | 100 | 21 | 62 | 0.9 |
| NA-58 | 1 | BF | 49 | 11 | 30 | 10 | 0 | 0 | 100 | 21 | 62 | 1.0 |
| NA-59 | 1 | BG | 49 | 11 | 30 | 10 | 0 | 0 | 100 | 21 | 63 | 0.9 |
| NA-60 | 2 | BH | 41 | 0 | 40 | 19 | 0 | 0 | 100 | 50 | 16 | 0.6 |
| NA-61 | 2 | BI | 41 | 0 | 40 | 19 | 0 | 0 | 100 | 50 | 16 | 0.6 |
| NA-62 | 2 | BJ | 41 | 0 | 40 | 19 | 0 | 0 | 100 | 50 | 16 | 0.6 |
| NA-63 | 2 | BK | 41 | 0 | 40 | 19 | 0 | 0 | 100 | 50 | 16 | 0.6 |

TABLE 10-1

| Test No. | Sheet thickness/ mm | TS (MPa) | El (%) | λ (%) | α (°) | Bending threshold | Workability | Elongation in tensile with notch of R30 $El_2$ (%) | $El_2/El_1$ | Example/ Comparative Example |
|---|---|---|---|---|---|---|---|---|---|---|
| NA-1 | 1.0 | 974 | 16.3 | 35.3 | 97 | 8 | GOOD | 6.1 | 0.374 | Example |
| NA-2 | 0.9 | 1162 | 13.2 | 27.1 | 99 | 7 | GOOD | 4.8 | 0.364 | Example |
| NA-3 | 0.8 | 1025 | 14.3 | 39.3 | 97 | 3 | GOOD | 4.3 | 0.301 | Example |
| NA-4 | 1.0 | 1195 | 11.6 | 29.2 | 92 | 3 | GOOD | 3.4 | 0.293 | Example |
| NA-5 | 0.9 | 1120 | 13.8 | 32.0 | 102 | 10 | GOOD | 4.3 | 0.312 | Example |
| NA-6 | 1.0 | 908 | 15.1 | 35.6 | 97 | 8 | GOOD | 5.2 | 0.344 | Example |
| NA-7 | 1.6 | 1083 | 13.4 | 34.5 | 84 | 6 | GOOD | 3.9 | 0.291 | Example |
| NA-8 | 1.8 | 1073 | 15.1 | 46.8 | 84 | 8 | GOOD | 5.4 | 0.358 | Example |
| NA-9 | 1.8 | 1240 | 12.2 | 51.3 | 76 | 0 | GOOD | 3.3 | 0.270 | Example |
| NA-10 | 1.7 | 1199 | 13.4 | 43.3 | 78 | 1 | GOOD | 3.8 | 0.284 | Example |
| NA-11 | 1.7 | 1104 | 14.0 | 48.5 | 78 | 1 | GOOD | 4.3 | 0.307 | Example |
| NA-12 | 1.3 | 986 | 12.8 | 45.9 | 84 | 1 | GOOD | 4 | 0.313 | Example |
| NA-13 | 1.1 | 907 | 15.8 | 41.2 | 89 | 2 | GOOD | 5.1 | 0.323 | Example |
| NA-14 | 0.9 | 1139 | 14.3 | 34.4 | 95 | 4 | GOOD | 4.7 | 0.329 | Example |
| NA-15 | 1.2 | 1150 | 13.6 | 59.4 | 93 | 8 | GOOD | 4 | 0.294 | Example |
| NA-16 | 1.2 | 1233 | 12.3 | 30.1 | 89 | 4 | GOOD | 5.2 | 0.423 | Example |
| NA-17 | 1.2 | 1138 | 13.3 | 31.2 | 87 | 3 | GOOD | 5.3 | 0.398 | Example |
| NA-18 | 1.2 | 946 | 15.6 | 35.8 | 90 | 5 | GOOD | 5.1 | 0.327 | Example |
| NA-19 | 1.7 | 940 | 16.1 | 70.1 | 77 | 0 | GOOD | 4.7 | 0.292 | Example |
| NA-20 | 1.0 | 1147 | 10.2 | 35.4 | 90 | 1 | GOOD | 3.8 | 0.373 | Example |
| NA-21 | 1.6 | 1033 | 14.9 | 62.2 | 83 | 5 | GOOD | 4.5 | 0.302 | Example |
| NA-22 | 1.6 | 1034 | 12.7 | 37.3 | 83 | 5 | GOOD | 3.9 | 0.307 | Example |
| NA-23 | 1.0 | 1233 | 13.2 | 26.2 | 94 | 5 | GOOD | 3.8 | 0.288 | Example |
| NA-24 | 1.6 | 985 | 12.2 | 25.9 | 82 | 4 | GOOD | 4.3 | 0.352 | Example |
| NA-25 | 1.0 | 1068 | 15.6 | 40.1 | 92 | 3 | GOOD | 4.9 | 0.314 | Example |
| NA-26 | 1.2 | 1026 | 15.3 | 56.9 | 89 | 4 | GOOD | 4.5 | 0.294 | Example |
| NA-27 | 1.4 | 1066 | 13.2 | 51.2 | 85 | 4 | GOOD | 3.9 | 0.295 | Example |
| NA-28 | 0.8 | 970 | 13.7 | 54.3 | 95 | 1 | GOOD | 4.2 | 0.307 | Example |
| NA-29 | 1.5 | 1217 | 15.7 | 42.2 | 86 | 6 | GOOD | 4.8 | 0.306 | Example |

TABLE 10-1-continued

| Test No. | Sheet thickness/ mm | TS (MPa) | El (%) | λ (%) | α (°) | Bending threshold | Workability | Elongation in tensile with notch of R30 $El_2$ (%) | $El_2/El_1$ | Example/ Comparative Example |
|---|---|---|---|---|---|---|---|---|---|---|
| NA-30 | 1.8 | 917 | 15.0 | 49.2 | 80 | 4 | GOOD | 4.7 | 0.313 | Example |
| NA-31 | 1.5 | 1028 | 12.1 | 67.4 | 84 | 4 | GOOD | 3.9 | 0.322 | Example |
| NA-32 | | Evaluation was impossible | | | | | BAD | Evaluation was impossible | | Comparative Example |

TABLE 10-2

| Test No. | Sheet thickness/ mm | TS (MPa) | El (%) | λ (%) | α (°) | Bending threshold | Workability | Elongation in tensile with notch of R30 $El_2$ (%) | $El_2/El_1$ | Example/ Comparative Example |
|---|---|---|---|---|---|---|---|---|---|---|
| NA-33 | 1.1 | 1295 | 8.2 | 22.1 | 86 | −1 | BAD | 1.8 | 0.220 | Comparative Example |
| NA-34 | 1.0 | 1155 | 10.3 | 62.4 | 96 | 7 | GOOD | 3.2 | 0.311 | Example |
| NA-35 | 1.5 | 1131 | 13.2 | 30.6 | 80 | 1 | GOOD | 4.2 | 0.318 | Example |
| NA-36 | 1.5 | 1052 | 15.2 | 23.4 | 78 | −2 | BAD | 3.4 | 0.224 | Comparative Example |
| NA-37 | 1.2 | 995 | 14.5 | 21.6 | 84 | −1 | BAD | 3.7 | 0.255 | Comparative Example |
| NA-38 | 1.8 | 1159 | 14.1 | 40.2 | 80 | 4 | GOOD | 4.5 | 0.319 | Example |
| NA-39 | 1.4 | 924 | 13.0 | 32.0 | 71 | −10 | GOOD | 4.4 | 0.338 | Example |
| NA-40 | 1.4 | 905 | 14.2 | 33.2 | 89 | 7 | GOOD | 4.3 | 0.303 | Example |
| NA-41 | 1.0 | 568 | 31.1 | 68.2 | 105 | 16 | GOOD | 10.5 | 0.338 | Comparative Example |
| NA-42 | 1.0 | 993 | 9.9 | 30.8 | 90 | 1 | BAD | 3.1 | 0.313 | Comparative Example |
| NA-43 | 0.9 | 912 | 13.1 | 28.4 | 98 | 6 | GOOD | 5.6 | 0.427 | Example |
| NA-44 | 1.4 | 901 | 15.2 | 51.5 | 95 | 14 | GOOD | 5.1 | 0.336 | Example |
| NA-45 | 1.5 | 1066 | 12.2 | 27.3 | 82 | 3 | GOOD | 4.1 | 0.336 | Example |
| NA-46 | 1.1 | 890 | 10.5 | 25.7 | 92 | 5 | BAD | 3.0 | 0.286 | Comparative Example |
| NA-47 | 1.2 | 1376 | 10.7 | 33.5 | 85 | 1 | GOOD | 3.4 | 0.318 | Example |
| NA-48 | 1.6 | 1125 | 16.4 | 21.4 | 71 | −7 | BAD | 4.5 | 0.274 | Comparative Example |
| NA-49 | 1.1 | 851 | 16.7 | 27.8 | 91 | 4 | GOOD | 5.8 | 0.347 | Comparative Example |
| NA-50 | 1.7 | 797 | 15.5 | 29.3 | 97 | 20 | GOOD | 4.8 | 0.310 | Comparative Example |
| NA-51 | 1.5 | 1607 | 6.1 | 30.5 | 72 | −8 | BAD | 1.5 | 0.246 | Comparative Example |
| NA-52 | 1.8 | 1169 | 11.9 | 25.2 | 79 | 4 | BAD | 3.2 | 0.269 | Comparative Example |
| NA-53 | 1.5 | 1197 | 7.2 | 44.1 | 84 | 4 | BAD | 2.2 | 0.306 | Comparative Example |
| NA-54 | 1.0 | 766 | 13.5 | 39.1 | 96 | 7 | GOOD | 4.1 | 0.304 | Comparative Example |
| NA-55 | 0.9 | 955 | 13.6 | 22.5 | 94 | 3 | BAD | 3.4 | 0.250 | Comparative Example |
| NA-56 | 1.0 | 974 | 10.2 | 35.2 | 97 | 8 | GOOD | 2.5 | 0.245 | Comparative Example |
| NA-57 | 1.0 | 974 | 16.2 | 34.1 | 92 | −6 | GOOD | 2 | 0.123 | Comparative Example |
| NA-58 | 1.0 | 974 | 16.4 | 34.8 | 93 | −5 | GOOD | 2 | 0.122 | Comparative Example |
| NA-59 | 1.0 | 974 | 16.3 | 34.9 | 97 | −2 | GOOD | 1.5 | 0.092 | Comparative Example |
| NA-60 | 0.9 | 1100 | 13.1 | 26.4 | 96 | −4 | GOOD | 2 | 0.153 | Comparative Example |
| NA-61 | 0.9 | 1100 | 13.2 | 26.9 | 96 | −4 | GOOD | 2.5 | 0.189 | Comparative Example |
| NA-62 | 0.9 | 900 | 13.3 | 27.1 | 99 | −1 | GOOD | 2.5 | 0.188 | Comparative Example |
| NA-63 | 0.9 | 1200 | 13.3 | 26.3 | 92 | −8 | GOOD | 1.5 | 0.113 | Comparative Example |

Examples in which the chemical composition and the manufacturing conditions were appropriate were excellent in tensile strength, elongation, and hole expandability, and were determined to have both strength and formability at a high level. The examples except for Example NA-39 were also excellent in limit bending angle. In Example NA-39, since Hv30/Hvi was not within a preferable range, the evaluation result of limit bending angle was not within a preferable range, but since other evaluation results were excellent, it was determined that the steel sheet had all of strength, formability, and deformability at a stress concentration portion at a high level.

On the other hand, in Comparative Example NA-32, in addition to an excessive rolling load, a hot-rolled sheet shape defect made it impossible to perform a test after hot rolling. This is considered to be because the finish rolling completion temperature was too low.

In Comparative Example NA-33, martensite was insufficient, and on the other hand, the proportion of martensite adjacent to ferrite and the maximum difference in hardness in a sheet thickness direction were excessive, and as a result, elongation, hole expandability, workability, and deformability at a stress concentration portion were insufficient, and the bending threshold was also less than 0. This is presumed to be because the cooling rate from finish rolling to coiling was slow, and thus nonuniformity of a microstructure was promoted.

In Comparative Example NA-36, the proportion of martensite adjacent to ferrite and the maximum difference in hardness in a sheet thickness direction were excessive, and as a result, hole expandability, workability, and deformability at a stress concentration portion were insufficient, and the bending threshold was also less than 0. This is presumed to be because the coiling temperature was high, and thus nonuniformity of a microstructure was promoted.

In Comparative Example NA-37, the proportion of martensite adjacent to ferrite was excessive, and as a result, hole expandability, workability, and deformability at a stress concentration portion were insufficient, and the bending threshold was also less than 0. This is presumed to be because the heating rate before switching was low.

In Comparative Example NA-41, the amount of ferrite was excessive, the other microstructures were insufficient, and as a result, tensile strength was insufficient. This is presumed to be because the maximum heating temperature is low.

In Comparative Example NA-42, the amount of ferrite was small, while the amount of martensite was excessive, and as a result, elongation and workability were impaired. This is presumed to be because the maximum heating temperature is high.

In Comparative Example NA-46, the amount of ferrite was excessive, the amount of martensite was insufficient, and workability was impaired. This is presumed to be because the cooling rate at 580° C. or more was insufficient.

In Comparative Example NA-48, granular bainite was not generated, martensite was insufficient while bainite was excessive, and further the proportion of martensite adjacent to ferrite was excessive. As a result, hole expandability, workability, and deformability at a stress concentration portion were impaired, and the bending threshold was less than 0. This is presumed to be because the staying time at 480° C. or more and 580° C. or less was short.

In Comparative Example NA-49, the amount of granular bainite was excessive, the amount of martensite was insufficient, and as a result, tensile strength was insufficient. This is presumed to be because the staying time at 480° C. or more and 580° C. or less was too long.

In Comparative Example NA-50, since C was insufficient, martensite was insufficient, and tensile strength was impaired.

In Comparative Example NA-51, since C was excessive, the amount of martensite was excessive, the other microstructures were insufficient, and elongation, workability, and deformability at a stress concentration portion were insufficient.

In Comparative Example NA-52, since Si+Al was insufficient, granular bainite was insufficient while bainite was excessive, and workability and deformability at a stress concentration portion were insufficient.

In Comparative Example NA-53, since Si+Al was excessive, the steel sheet was embrittled, and elongation and workability were insufficient.

In Comparative Example NA-54, since Mn+Cr was insufficient, the amount of ferrite was excessive while martensite was insufficient, and tensile strength was insufficient.

In Comparative Example NA-55, since Mn+Cr was excessive, coarse Mn oxide or sulfide was formed, and hole expandability, workability, and deformability at a stress concentration portion were deteriorated.

In Comparative Example NA-56, the maximum difference in hardness in a sheet thickness direction was excessive, and as a result, deformability at a stress concentration portion was insufficient. This is presumed to be because the heating rate was switched in a too low temperature range.

In Comparative Example NA-57, the maximum difference in hardness in a sheet thickness direction was excessive, and as a result, deformability at a stress concentration portion was insufficient. This is presumed to be because the heating rate was switched in a too high temperature range.

In Comparative Example NA-58, the maximum difference in hardness in a sheet thickness direction was excessive, and as a result, deformability at a stress concentration portion was insufficient. This is presumed to be because the heating rate in the temperature range of Ac1 to Ac1+20° C. was too high.

In Comparative Example NA-59, the maximum difference in hardness in a sheet thickness direction was excessive, and as a result, deformability at a stress concentration portion was insufficient. This is presumed to be because the heating rate in the temperature range of Ac1 to Ac1+20° C. was too low.

In Comparative Example NA-60, granular bainite was not generated, further the proportion of martensite adjacent to ferrite was excessive, and as a result, deformability at a stress concentration portion was insufficient. This is presumed to be because the staying time at 480 to 580° C. was insufficient.

In Comparative Example NA-61, granular bainite was not generated, further the proportion of martensite adjacent to ferrite was excessive, and as a result, deformability at a stress concentration portion was insufficient. This is presumed to be because the staying time at 500 to 630° C. was insufficient.

In Comparative Example NA-62, granular bainite was not generated, further the proportion of martensite adjacent to ferrite was excessive, and as a result, deformability at a stress concentration portion was insufficient. This is presumed to be because the staying time at 500 to 630° C. was excessive.

In Comparative Example NA-63, granular bainite was not generated, further the proportion of martensite adjacent to ferrite was excessive, and as a result, deformability at a stress concentration portion was insufficient. This is presumed to be because a staying time within a temperature range of 480 to 580° C. and a temperature range of 500 to 630° C. was not provided.

INDUSTRIAL APPLICABILITY

As described above, according to the present invention, it is possible to provide a steel sheet which is suitable as a structural member of a vehicle or the like, has excellent formability, and has a maximum tensile strength of 900 MPa or more, and a manufacturing method of the same. Since the steel sheet of the present invention is particularly excellent in collision safety, the present invention has high applicability in the vehicle industry and the steel sheet manufacturing and working industry.

BRIEF DESCRIPTION OF THE REFERENCE SYMBOLS

Prior austenite grain boundary
2 Bainitic ferrite
3 Granular bainite
5 Carbide
6 Upper bainite
7 Lower bainite

The invention claimed is:

1. A steel sheet comprising:

a chemical composition including, by mass %,

C: 0.07% or more and 0.15% or less,

Si+Al: 0.20% or more and 2.50% or less,

Mn+Cr: 1.20% or more and 4.00% or less,

P: 0% or more and 0.040% or less,

S: 0% or more and 0.010% or less,

N: 0% or more and 0.010% or less,

O: 0% or more and 0.006% or less,

Mo: 0% or more and 0.50% or less,
Ti: 0% or more and 0.20% or less,
Nb: 0% or more and 0.20% or less,
B: 0% or more and 0.010% or less,
V: 0% or more and 0.50% or less,
Cu: 0% or more and 1.00% or less,
W: 0% or more and 0.10% or less,
Ta: 0% or more and 0.10% or less,
Ni: 0% or more and 1.00% or less,
Sn: 0% or more and 0.050% or less,
Co: 0% or more and 0.50% or less,
Sb: 0% or more and 0.050% or less,
As: 0% or more and 0.050% or less,
Mg: 0% or more and 0.050% or less,
Ca: 0% or more and 0.040% or less,
Y: 0% or more and 0.050% or less,
Zr: 0% or more and 0.050% or less,
La: 0% or more and 0.050% or less, and
Ce: 0% or more and 0.050% or less,
wherein a remainder includes Fe and impurities,
a metallographic structure in a thickness ¼ portion includes, by volume percentage,
ferrite: 10% or more and less than 50%,
granular bainite: 5% or more and less than 40%,
martensite: 30% or more and 55% or less,
upper bainite and lower bainite: less than 30% in total,
pearlite: less than 10%, and
residual austenite: less than 5%,
a proportion of the number of the martensites adjacent to the ferrite to the number of the metallographic structures adjacent to the ferrite is 30% or less in the thickness ¼ portion, and
a difference between an absolute maximum value and an absolute minimum value of Vickers hardness at a load of 50 gf obtained at an interval of 30 μm from a position of a depth of 100 μm in a sheet thickness direction from a surface of the steel sheet as a starting point to a thickness middle portion position is 60 HV or less,
wherein the metallographic structure is identified by observing a 100 μm×100 μm region of a first cross section of the steel sheet parallel to a rolling direction and perpendicular to the sheet surface at a magnification of 1000 to 50000 times by electron back scattering diffraction (EBSD), X-ray measurement, corrosion using a nital reagent or a LePera solution, and a scanning electron microscope, and
wherein the proportion of the number of the martensites adjacent to the ferrite to the number of the metallographic structures adjacent to the ferrite is calculated by observing a 100 μm×100 μm region of a second cross section of the steel sheet parallel to the rolling direction and perpendicular to the sheet surface in the thickness ¼ portion using EBSD at a step interval of 0.2 μm.

2. The steel sheet according to claim 1, wherein the chemical composition contains one or more selected from the group of, by mass %, Mo: 0.01% or more and 0.50% or less,
Ti: 0.001% or more and 0.20% or less,
Nb: 0.0001% or more and 0.20% or less,
B: 0.0001% or more and 0.010% or less,
V: 0.001% or more and 0.50% or less,
Cu: 0.001% or more and 1.00% or less,
W: 0.001% or more and 0.10% or less,
Ta: 0.001% or more and 0.10% or less,
Ni: 0.001% or more and 1.00% or less,
Sn: 0.001% or more and 0.050% or less,
Co: 0.001% or more and 0.50% or less,
Sb: 0.001% or more and 0.050% or less,
As: 0.001% or more and 0.050% or less,
Mg: 0.0001% or more and 0.050% or less,
Ca: 0.001% or more and 0.040% or less,
Y: 0.001% or more and 0.050% or less,
Zr: 0.001% or more and 0.050% or less,
La: 0.001% or more and 0.050% or less, and
Ce: 0.001% or more and 0.050% or less.

3. The steel sheet according to claim 2,
wherein a ratio Hv30/Hvi of Vickers hardness Hv30 at a load of 0.29 N at a position of a depth of 30 μm in the sheet thickness direction from the surface of the steel sheet to Vickers hardness Hvi at a load of 0.29 N in the thickness ¼ portion is 0.8 or less, and
a tensile strength is 900 MPa or more when measured in accordance with JIS Z 2241:2011.

4. The steel sheet according to claim 3, further comprising a hot-dip galvanized layer or a hot-dip zinc alloy-plated layer disposed on the surface.

5. The steel sheet according to claim 3, further comprising a galvannealed layer disposed on the surface.

6. The steel sheet according to claim 2, further comprising a hot-dip galvanized layer or a hot-dip zinc alloy-plated layer disposed on the surface.

7. The steel sheet according to claim 2, further comprising a galvannealed layer disposed on the surface.

8. The steel sheet according to claim 1,
wherein a ratio Hv30/Hvi of Vickers hardness Hv30 at a load of 0.29 N at a position of a depth of 30 μm in the sheet thickness direction from the surface of the steel sheet to Vickers hardness Hvi at a load of 0.29 N in the thickness ¼ portion is 0.8 or less, and
a tensile strength is 900 MPa or more when measured in accordance with JIS Z 2241:2011.

9. The steel sheet according to claim 8, further comprising a hot-dip galvanized layer or a hot-dip zinc alloy-plated layer disposed on the surface.

10. The steel sheet according to claim 8, further comprising a galvannealed layer disposed on the surface.

11. The steel sheet according to claim 1, further comprising a hot-dip galvanized layer or a hot-dip zinc alloy-plated layer disposed on the surface.

12. The steel sheet according to claim 1, further comprising a galvannealed layer disposed on the surface.

* * * * *